(12) United States Patent
Dressick et al.

(10) Patent No.: US 7,803,498 B2
(45) Date of Patent: Sep. 28, 2010

(54) MATERIALS AND STRUCTURES THEREOF USEFUL AS ELECTROCATALYSTS

(75) Inventors: Walter J. Dressick, Waldorf, MD (US); Cynthia N. Kostelansky, Alexandria, VA (US); Terence L. Schull, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1005 days.

(21) Appl. No.: 11/513,436

(22) Filed: Aug. 25, 2006

(65) Prior Publication Data

US 2008/0050642 A1 Feb. 28, 2008

(51) Int. Cl.
*H01M 8/02* (2006.01)
*H01M 4/00* (2006.01)
*H01M 4/92* (2006.01)
*H01M 4/96* (2006.01)
*B01J 23/40* (2006.01)

(52) U.S. Cl. .................. 429/524; 429/530; 502/185; 502/150

(58) Field of Classification Search .................. 429/44, 429/42, 524; 502/185, 150
See application file for complete search history.

(56) References Cited

U.S. PATENT DOCUMENTS 5,344,455 A * 9/1994 Keogh et al. .................. 600/36
5,847,228 A * 12/1998 Monflier et al. ............. 568/454

OTHER PUBLICATIONS

Delamar.et al., "Covalent Modification of Carbon Surfaces by Grafting of Functionalized Aryl Radicals Produced from Electrochemical Reductions of Diazonium Salts", J. Am. Chem. Soc. 1992, 114, P5884-5886.*
Decher, "Fuzzy Nanoassemblies: Toward Layered Polymeric Multicomposites", Science, vol. 277, Aug. 29, 1997.*
Liu et al., "Electrocrystallized platinum nanoparticle on carbon substrate", Electrochemistry Communications, 2, 2000, P800-804.*
Schull et al., "A platinum phosphine complex exhibiting both inter and intra molecular hydrogen bonding", Polyhedron, vol. 23, 2004, Abstract.*
Zhang et al., "Immobilization Capacities of Self-Assembled Aminosilane Films", Symposium: Interfaces in Organic and Molecular Electronics, Dec. 1-3, 2003.*
Caron et al., "Convenient synthesis of new amphiphilic triphenylphosphine analogues for aqueous biphasic catalysis", Tetrahedron Letters, 42, 2001, P8837-8840.*

* cited by examiner

*Primary Examiner*—Jonathan Crepeau
*Assistant Examiner*—Kenneth Douyette
(74) *Attorney, Agent, or Firm*—Amy Ressing; Stephen T. Hunnius

(57) ABSTRACT

A nanostructured electrode comprising a conductive electrode substrate having a surface functional group, a catalytic nanoparticle stabilized by a covalently-bound ligand bearing a peripheral functional group capable of interacting to the surface functional group, and a material capable of binding to the peripheral functional group. The conductive electrode substrate can be chemically modified and the surface functional group can create a layer of charge or chemical reactivity. The conductive electrode substrate can be chemically or electrochemically modified to create a surface functional group via covalent grafting capable of supporting multilayer deposition to create a layer of charge or chemical reactivity on the surface. The nanoparticle can be a platinum nanoparticle with covalently bonded negatively-charged ligands and the bridging material can be a polyelectrolyte.

28 Claims, 23 Drawing Sheets

Sodium poly-styrenesulfonate (PSS)

Poly-4-vinylpyridine (PVP)

Polydiallyldimethyl-ammonium Chloride (PDDA)

Sodium polyacrylate (PAA)

Polyallylamine hydrochloride (PAH)

Branched Polyethylenimine (PEI)

2, 2'-Bipyridine Ligand

1, 10-Phenanthroline Ligand

2, 2': 6', 2''-Terpyridine Ligand

Triphenylphosphine Ligand

TPPTP Ligand

TPPTS Ligand

TPPTC Ligand

TXPTS Ligand

DCETMA Ligand

TCEP Ligand

Diameter ~ 1.8 nm; Charge = 4−

MATERIALS AND STRUCTURES THEREOF USEFUL AS ELECTROCATALYSTS

BACKGROUND

Fuel cells are simple devices capable of continuously converting stored chemical energy into electricity. In general, a fuel cell comprises a pair of electrodes separated by a semipermeable electrolyte membrane. At one of the electrodes, the anode, oxidation of input fuel occurs. The fuels used depend on the type of fuel cell system as described below and include, but are not limited to, materials such as glucose, methanol, ethanol, hydrogen, formic acid, carbon monoxide, and simple hydrocarbons like methane, propane, or butane. The electrons extracted from the fuel are transferred as electric current through an external circuit to the second electrode, the cathode, where an input oxidant is electrochemically reduced. Typically, oxygen is the oxidant and it is reduced in a four-electron process to water. The semi-permeable membrane functions to separate the fuel and oxidant. In addition, transfer of protons or other ions through the semipermeable membrane ensures charge balance and completes the circuit.

Although a variety of different systems have been developed, fuel cells can be generally classified as one of three types based on the electrolyte membrane type and power output operating conditions. Biological fuel cells employ electrodes modified with enzymes or microbes that function as the electrocatalysts. Although these cells usually employ simple ion exchange membranes, cells that require no membrane can also be fabricated. In these cases, cross-reactions of the anolyte fuel and catholyte oxidant with the opposite electrodes are prevented due to the high specificity of the bioelectrocatalytic reactions at the electrodes. Net chemical reactions for these cells are usually quite simple, for example, eventual oxidation of glucose to carbon dioxide with the corresponding reduction of oxygen to water, and power outputs are small, typically ranging from microwatts to milliwatts.

Fuel cells at the other extremum of power output generally utilize ceramic-based or solid electrolyte membranes, operate at temperatures greater than ~600° C., and can reach power output levels of kilowatts to megawatts with fuel power conversion efficiencies exceeding 40%. For example, solid oxide fuel cells operating at temperatures exceeding ~800° C. utilize a solid oxide electrolyte material that transports oxide anions through the membrane to react directly with fuel at efficiencies approaching 60%. Likewise, molten carbonate fuel cells utilize a porous ceramic membrane containing a mixture of molten carbonates as an electrolyte and can reach similar operating efficiencies. Both types of cells can utilize a variety of fuels and, with proper operating configurations, achieve power outputs approaching ~100 megawatts.

Polymer electrolyte membrane (PEM) fuel cells, also known as proton exchange membrane fuel cells, represent the third general class of fuel cell systems. PEM fuel cells use a solid polymer as the electrolyte membrane in combination with porous carbon electrodes containing Pt catalyst. Nafion® and related ionomers having good proton conductivities are usually used as the polymer electrolyte membranes. These systems typically generate power at levels ranging from watts to kilowatts and operate at temperatures ranging from ~70° C. to ~200° C. Their light weight, durability, and respectable power densities compared to other types of fuel cells make them attractive candidates for both portable (e.g., automotive) and stationery (e.g., home power) applications. A majority of the research in this area involves fuel cells using either methanol or hydrogen as fuels. PEM fuel cells using methanol as fuel and generating power via a methanol oxidation reaction (MOR) will hereafter be referred to as direct methanol fuel cells (DMFCs), while those fueled by hydrogen and generating power via the oxidation of hydrogen will be labeled as hydrogen fuel cells (HFCs).

As a liquid, methanol is a more attractive fuel than hydrogen, at least for automotive applications, since it is more readily handled and transported using the existing petroleum hydrocarbon infrastructure. Unfortunately, oxidation of methanol in a PEM fuel cell invariably produces carbon monoxide as an intermediate oxidation product, which can poison the Pt catalyst and significantly reduce the power output of the cell. In contrast, hydrogen presents obvious dangers regarding storage and handling but is oxidized cleanly in a fuel cell to protons, which are ultimately captured as water.

PEM fuel cell electrodes are heterogeneous supported catalyst structures whose electrocatalytic activities are greatly affected by the microenvironment surrounding the catalyst particles. Electrodes are usually fabricated by intimately mixing a colloidal Pt electrocatalyst, together with a small amount of Nafion® or other ionomer, in an electrically conductive porous Vulcan carbon matrix. The resulting mixture is usually applied as thin layers to both sides of a solid Nafion® film to prepare the separate anode and cathode electrodes, which are fixed by hot-pressing or related techniques to complete the membrane electrode assembly (MEA).

The power output available from a particular PEM fuel cell type and its power conversion efficiency are functions of the structure and composition of the MEA. Consider, for example, a HFC system. During operation of the cell, electrocatalysis is thought to occur most efficiently at a triple phase boundary (R. O'Hayre, D. M. Barnett, F. B. Prinz *Electrochem. Soc.*, 152, A439 (2005)), where $H_2$ fuel contacts the junction formed by a colloidal metal catalyst particle with the ionomer and carbon support. Specifically, the hydrogen oxidation reaction (HOR) occurring at the anode (eq. (1)) is thought to be facilitated at the triple phase boundary by efficient removal of the electron and proton products from the catalytic particle sites by the carbon support and ionomer, respectively, minimizing the possibility of a reverse reaction. Likewise, enhanced transport of electrons and protons via the conductive carbon and ionomer species, respectively, to catalytic particle sites at triple phase boundaries has been proposed to facilitate the oxygen reduction reaction (ORR) occurring at the cathode (eq. (2)). Similar models have been proposed for operation of DMFCs. Consequently, optimization of the MEA structure via changes in fabrication materials and techniques to maximize the occurrence of such triple phase boundaries represents a continuing focus for research to improve fuel cell performance.

Anode: $H_2 \rightarrow 2H^+ + 2e^-$   (1)

Cathode: $O_2 + 4H^+ + 4e^- \rightarrow 2H_2O$   (2)

Remediation of inefficiencies specifically associated with the properties and performances of the polymer electrolyte membrane and the Pt nanoparticle catalysts to improve fuel cell performance comprise two additional important research areas. For example, while Nafion® polymer electrolyte membranes efficiently transport protons required for successful cell operation, the internal electrical resistance of these semipermeable membranes and fuel crossover through them can reduce cell performance. The electrochemical performance of Pt catalysts is also limited, especially at the cathode where the ORR suffers from slow kinetics requiring high overpotentials and Pt loadings too high for viable commercial use.

Improvements in polymer electrolyte membranes to date have focused primarily on the use of new materials and modification of membrane structures to address PEM resistance and fuel crossover issues. Current strategies for improving the electrocatalytic activity of Pt-based catalysts mainly consist of combining Pt with other transition metals, replacing Pt altogether with other less expensive metals, or tailoring the Pt particle size to control the relative fraction of Pt surface atoms.

While these efforts have yielded considerable improvements in PEM fuel cell performance with regard to power density, efficiency, durability, and stability, further efforts and new research paradigms are still required to realize commercial systems capable of competing economically with current power sources. In this disclosure, we present a new paradigm for the development of PEM fuel cells having superior performance characteristics based on the fabrication of nanostructured electrode architectures using well-defined Pt nanoparticle (NP) catalysts whose electrocatalytic activities are determined via strict control of particle morphology and surface functionalization.

DESCRIPTION

Figure 1:
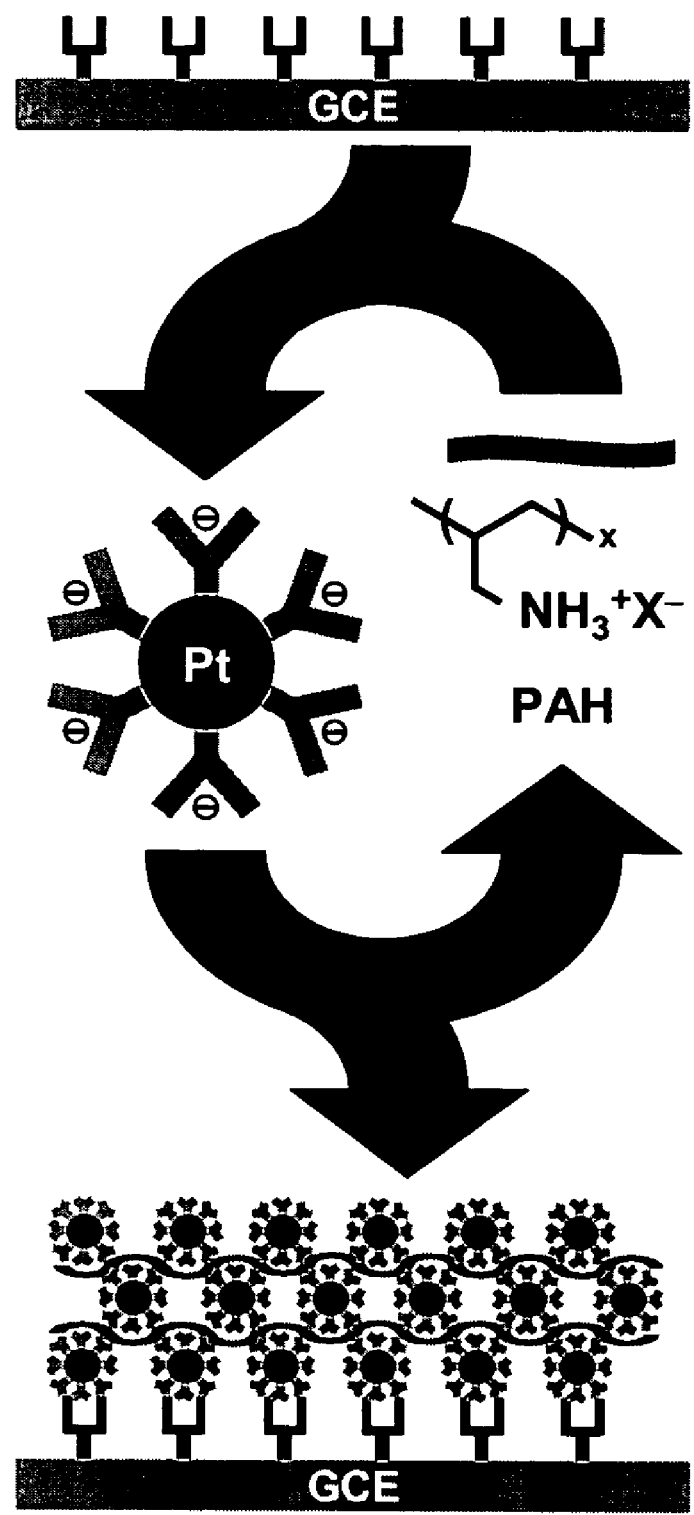
FIG. 1: LBL Multilayer Electrode Fabrication Scheme. The example shows multilayer fabrication using Pt NPs stabilized by negatively-charged ligands (Y-shape structures) and PAH polycation. Substrate is a glassy carbon electrode (GCE) functionalized by a cationic aminophenyl (APh) monolayer (goalpost structures). The functionalized by a cationic aminophenyl (APh) monolayer (goalpost structures). The $X^-=Cl^-$, $ClO_4^-$, and related anions. The rinse steps are not shown.

As mentioned in the preceding section, current research aimed at improving fuel cell efficiencies focuses primarily on one of three areas: (1) formulation and processing changes associated with MEA fabrication in order to increase the fraction of triple phase boundary sites attributed to enhanced electrocatalytic performance; (2) modification of Pt NP electrocatalysts via control of the nanoparticle size, alloying with other metals, or use of alternative metals to lower costs and increase catalytic efficiencies; and (3) modification of the structure and composition of the polymer electrolyte membrane to decrease internal cell resistance, promote ion (usually proton) conductivity, and minimize fuel crossover. Described here is a general method for the fabrication of nanostructured three-dimensional electrode architectures, using ligand-stabilized Pt NPs as electrocatalysts, that exhibit state-of-the-art efficiencies as measured by Pt mass-specific activity, $i_m$ (vide infra), at 0.9 V for the ORR in PEM fuel cells (H. A. Gasteiger, S. S. Kocha, B. Sompalli, F. T. Wagner *Appl. Catal. B-Environ.*, 56, 9 (2005)). Consequently, the approach embodies and combines both control of MEA electrode fabrication and Pt NP activity, rather than modification of the ionomer membrane. However, as discussed below, proper implementation of the methods can also indirectly yield further fuel cell efficiency improvements due to decreased fuel crossover through the ionomer membrane.

The approach involves fabricating structured electrode architectures exhibiting superior electrocatalytic activities via layer-by-layer (LBL) deposition techniques (G. Decher *Science*, 277, 1232 (1997)), using Pt NPs whose physicochemical properties, including electrocatalytic activity, water solubility, net charge, and nanoparticle dispersion stability, among others, can be tailored via the judicious choice of the ligand(s) covalently coordinated to the NP surface (vide infra). A generalized scheme for fabrication of structured electrode architectures using said tailored Pt NPs is shown in FIG. 1.

The fabrication of an electrode via a LBL method usually exploits attractive electrostatic interactions between oppositely-charged components to facilitate film deposition. For example, FIG. 1 illustrates an example of one common deposition protocol in which the polymer component is a polycation such as polyallylamine hydrochloride (PAH). Likewise, the conductive glassy carbon electrode (GCE) substrate used for the deposition of the multilayer has been electrochemically modified to create the proper surface functional groups needed to support multilayer growth, for example in this case via covalent grafting of a protonated aminophenyl (APh) functional group to create an initial layer of positive charge on the surface (M. Delamar, R. Hitmi, J. Pinson, J. M. Savéant *J. Am. Chem. Soc.*, 114, 5883 (1992)). Therefore, the ligand-stabilized Pt NP component must possess sufficient water solubility and a net negative surface charge under these deposition conditions in order to facilitate electrostatic adsorption. This requires that the ligand coordinated to the Pt NP surface contain as a portion of its structure at least one negatively-charged functional group that does not bind the Pt surface. Furthermore, said negatively-charged functional group(s) must not interfere with the binding of the ligand to the Pt surface by another functional group or groups within the same ligand capable of covalently binding to the Pt surface. For systems satisfying these conditions, immersion of the modified GCE substrate in the aqueous anionic ligand-stabilized Pt NP dispersion and the aqueous polycationic PAH solution in alternating fashion, with aqueous rinsing after each treatment, leads to build up of multilayer electrode architectures comprising alternating layers of Pt NPs and polyelectrolyte according to FIG. 1.

Figure 2:
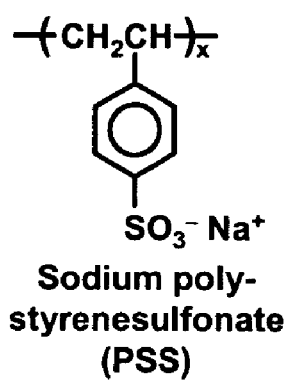
FIG. 2: Representative Structures of Some Polyelectrolytes Useful for the Fabrication of Multilayered Electrode Architectures.
Figure 2:
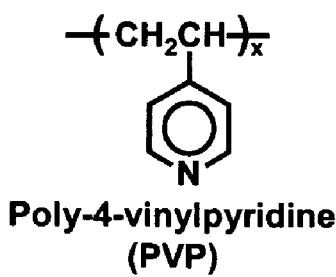
Figure 2:
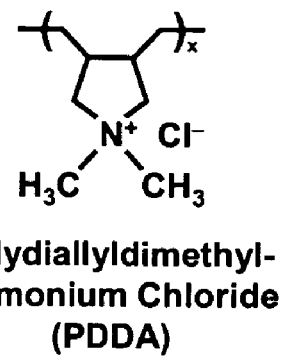
Figure 2:
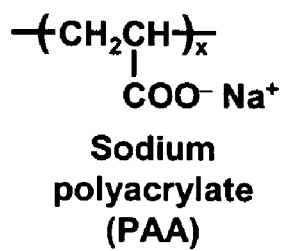
Figure 2:
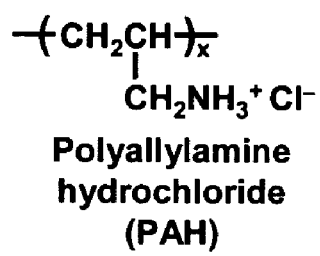
Figure 2:
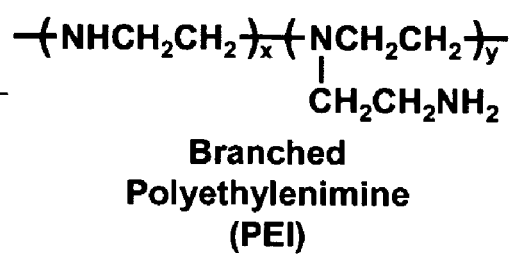
Figure 3:
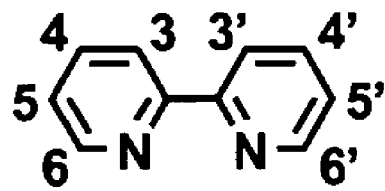
FIG. 3: Structures of Nitrogen Ligands Showing Numbered Positions for Substituents.
Figure 3:
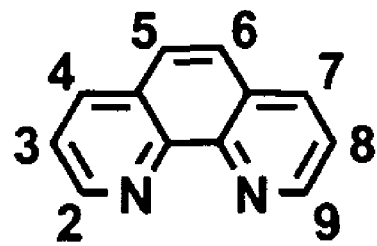
Figure 3:
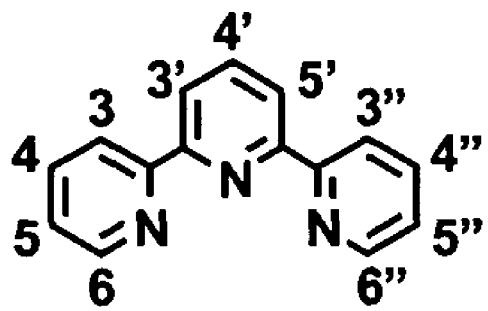
Figure 4:
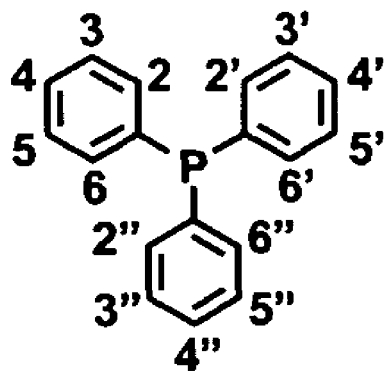
FIG. 4: Triarylphosphine Ligand Structures. The core triphenylphosphine ligand with substituent positions numbered is shown in the leftmost position in the upper row. Structures and abbreviations for some specific ligands bearing water soluble, charged substituents in the meta—(i.e., 3- or 5-) or para—(i.e., 4-) positions on each aromatic ring are also shown. All structures shown are the protonated forms of each ligand.
Figure 4:
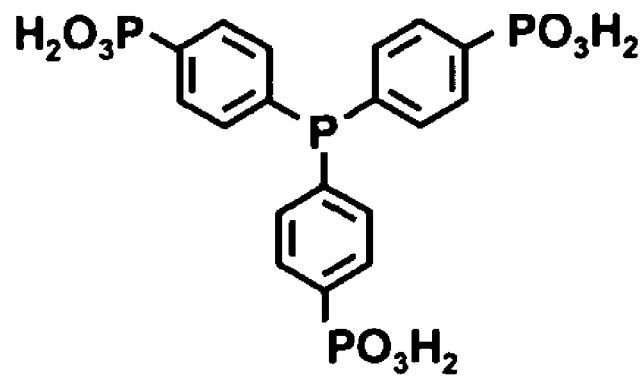
Figure 4:
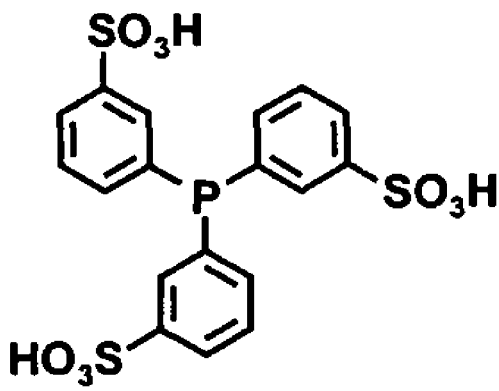
Figure 4:
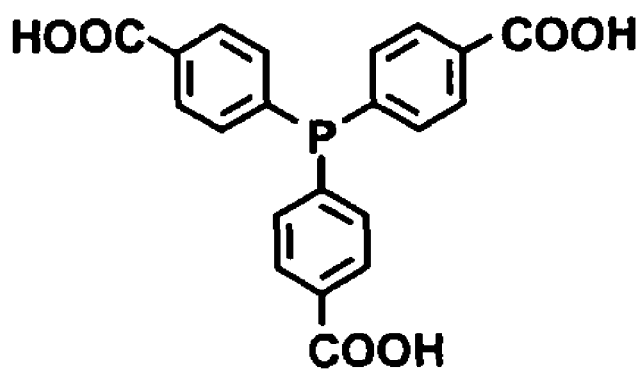

There are, of course, other possible alternatives for multilayer fabrication using the general method of FIG. 1. For example, multilayered electrode structures can clearly also be fabricated using Pt NPs stabilized using a covalently coordinated cationic ligand, in combination with a polyanion as the film components. FIG. 2 illustrates structures of some representative polycations and polyanions. Likewise, FIGS. 3 and 4, as discussed below, show representative structures of some ligands useful for stabilizing Pt NPs. Note that the materials shown in FIGS. 2-4 are meant solely as examples and do not represent an exhaustive listing of polyelectrolytes and ligands, nor are they meant to limit the scope of the invention. Multilayers stabilized by forces other than electrostatic attraction can also be fabricated. For example, multilayers have been fabricated using separate components, such as carboxylic acids and amides, having the abilities to form hydrogen-bonded association complexes. Similar multilayers stabilized by hydrogen bonding interactions can be fabricated using Pt NPs stabilized by ligands bearing pendant carboxylic acid groups as one component, with polyacrylamide as the second component of the film.

The choice of ligand can also affect the electronic properties, and therefore the electrocatalytic ability, of the Pt NP. Another aspect of the approach involves tailoring the physicochemical properties, including electrocatalytic activity, water solubility, net charge, and nanoparticle dispersion stability, among others, of Pt nanoparticles via the judicious choice of the ligand(s) covalently coordinated to the Pt particle surface. The use of coordinated ligands as described herein to prepare well-defined Pt nanoparticle systems and control their physicochemical properties has not been exploited as a means to improve electrocatalytic activities of fuel cell electrode systems.

However, ligands coordinated to single metal atoms are well known to affect activity of the metal as a homogeneous catalyst. Limited work has also shown that the structure of a ligand coordinated to a metal nanoparticle can alter the selectivity of a chemical reaction, favoring one product over another (G. Schmid, V. Maihack, F. Lantermann, S. Peschel *J. Chem. Soc.; Dalton Trans.*, 589 (1996)). Coordinated ligands not only can affect the selectivity of metal nanoparticles, they can also influence the electronic properties of the metal nanoparticle core (H. Modrow, S. Bucher, J. Hormes, R. Brinkmann, H. Bönnemann *J. Phys. Chem. B*, 107, 3684 (2003)). Even small changes in the protecting ligand shell can lead to varying electronic properties of the metal core, as has been observed for various ligand-stabilized Co, Pd, Fe, Ru, and Pt nanoparticles using surface-sensitive spectroscopic techniques such as EXAFS, XANES, and XPS. Such changes can have profound effects on the catalytic activity of the metal nanoparticle. For example, chemisorption of carbon monoxide to the surface of a Pt nanoparticle is known to block catalytic sites for oxidation of methanol or hydrogen in PEM fuel cells, greatly diminishing their power output (S. Yamazaki, T. Ioroi, Y. Yamada, K. Yasuda, T. Kobayashi *Angew. Chem. Int. Ed.*, 45, 3120 (2006)). Likewise, chemisorption of alkylthiol ligands is well known to poison Pt nanoparticles as electrocatalysts for the ORR(H. Ye, R. M. Crooks *J. Am. Chem. Soc.*, 127, 4930 (2005)).

These observations clearly demonstrate the ability to tune the electronic, and consequently the electrocatalytic, properties of the Pt nanoparticles by changing the protecting ligand shell coordinated to the Pt nanoparticle surface. They also indicate that ligands having very strong π-acceptor or σ-donor properties that lead to strong chemisorption of said ligands at one or more atomic Pt sites on the Pt NP surface can inhibit electrocatalysis and are usually not preferred as stabilizing ligands. Preferred Pt NP stabilizing ligands are those ligands having more moderate π-acceptor and/or σ-donor properties, as are well-known to inorganic chemists and others skilled in the art of the design of transition metal catalysts.

Among these are derivatives of 1,10-phenanthroline, 2,2':6', 2"-terpyridine, and 2,2'-bipyridine, whose general structures and ring numbering conventions are shown in FIG. 3, preferably having one or more substituents at the 3, 4, 5, 6, 7, and/or 8 positions, the 4, 5, 4', 4", and/or 5" positions, and the 4, 5, 4', and/or 5' positions, respectively. Preferred substituents at these sites include electron donating or accepting functional groups, not containing sulfur having a formal oxidation state <+4, with Hammett σ constants in the range ~0.85<σ<~+ 0.85. Some specific examples of typical electron donating and accepting substituents have been described by Della Ciana and co-workers (L. Della Ciana, W. J. Dressick, D. Sandrini, M. Maestri, M. Ciano *Inorg. Chem.*, 29, 2792 (1990)) and Hino and co-workers (J. K. Hino, L. Della Ciana, W. J. Dressick, B. P. Sullivan *Inorg. Chem.*, 31, 1072 (1992)), both of which are incorporated herein in their entirety, and include —NO$_2$, —CN, —CF$_3$, —CO$_2$R (R=H or alkyl group containing 4 or fewer carbon atoms), —C$_6$H$_5$, -halogen, -alkyl (containing 4 or fewer carbons atoms), —OR (R=alkyl group containing 4 or fewer carbons atoms), and —NR$_2$ (R=H or an alkyl group containing 4 or fewer carbons atoms), among others. Said ligands should also contain at least one charged substituent to provide water solubility for and electrostatically stabilize the Pt NPs against agglomeration; said preferred charged substituents include —PO$_3^{2-}$, —SO$_3^-$, or —COO. Derivatives of 1,10-phenanthroline, 2':6',2"-terpyridine, and 2,2'-bipyridine having substituents in the 2 and/or 9 positions, 6 and or 6" positions, and 6 and/or 6' positions, respectively, are also useful provided that the substituent is not sufficiently bulky to prevent bonding of the pyridyl N groups to the Pt surface because of steric hindrance effects. In general, smaller substituents such as methyl and carboxyl groups, which are known by those skilled in the art of synthesis of transition metal complexes to form coordinatively-saturated complexes with an individual transition metal atom are favored, whereas bulky substituents such as tertiary butyl or neopentyl groups that severely inhibit or exclude coordinatively-saturated complex formation with an individual transition metal atom are disfavored. Derivatives of 2':6',2"-terpyridine and 2,2'-bipyridine having substituents in the 3,3',5', and/or 3" positions and 3 and/or 3' positions, respectively, are less favored because unfavorable steric interactions between nonhydrogen substituents in these positions and the adjacent pyridyl ring can diminish or inhibit binding of the ligand to the NP surface.

Figure 5:
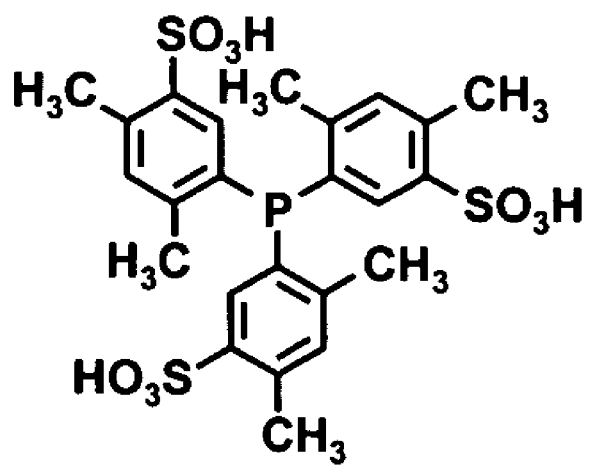
FIG. 5: Structures of Other Phosphine Ligands Tested as Stabilizers for Pt NPs.
Figure 5:
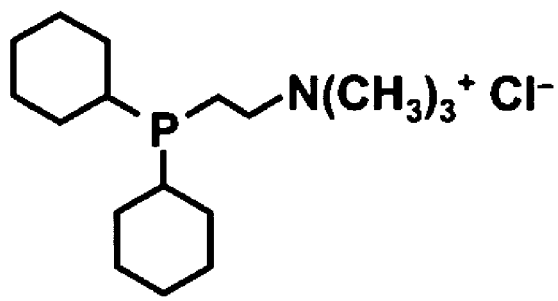
Figure 5:
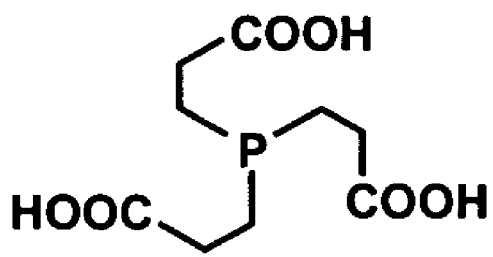

Derivatives of triphenylphosphine, whose general structure and ring numbering conventions are shown in FIG. 4, also exhibit sufficiently moderate π-acceptor and/or σ-donor properties and can represent another preferred class of ligands for the purpose of our invention. In this case, charged species such as PO$_3^{2-}$, —SO$_3^-$, or —COO$^-$ can be preferred ligand substituents. At least one such substituent, covalently attached to the meta-positions (i.e., 3, 3', 3", 5, 5', and/or 5" positions) and/or more preferably the para-positions (i.e., 4, 4', and/or 4" positions) of the phenyl rings of triphenylphosphine core structure of FIG. 4 may be required to provide a net negative or positive ligand charge and water solubility for use in this invention. It is noted that the presence of these or any other sterically hindered substituents in the ortho-positions (i.e., 2, 2', 2", 6, 6', and/or 6" positions) of the phenyl rings of the triphenylphosphine core structure are usually strongly disfavored for the purpose of this invention in that stabilized nanoparticles are usually not formed or, if formed, are often unstable. For example, attempts to form ligand-stabilized Pt NPs using sterically hindered TXTPS (note FIG. 5) according to these protocols, as described in the Example 7 below, led solely to formation of the TXTPS oxide in solution. Likewise, the trialkylphosphines TCEP and DCETMA shown in FIG. 5, which are stronger σ-donors and more basic ligands than triarylphosphines, were oxidized to the corresponding phosphine oxides without binding to the Pt NPs, as described in Example 7, with precipitation of bulk Pt black also noted for the DCETMA ligand.

It can be noted here that the general concept of LBL fabrication of multilayered electrodes using Pt NPs and polyelectrolytes, such as those shown in FIG. 2, has previously been described in the scientific literature. However, in each of the literature cases reported the Pt NPs have been stabilized by non-covalent adsorption of a water soluble polyelectrolyte or other protecting agent via electrostatic, hydrogen bonding, and/or van der Waals interactions, rather than covalent binding of a ligand species as described herein. For example, several groups have prepared Pt NPs encapsulated by adsorbed polyacrylate (PAA) and electrostatically adsorbed them directly to a substrate surface or in alternating fashion together with poly(diallyldimethylammonium) chloride (PDDA) to fabricate single or multilayered electrodes, respectively (P. Karam, Z. G. Estephen, M. El Haraketh, M. Houry, L. I. Halaoui *Electrochem. Solid-State Lett.*, 9, A144 (2006)). Adsorption of materials containing carbonyl groups, such as comprise PAA, has been ascribed to weak interactions between the Pt surface and non-bonding lone pair electrons of carbonyl groups (L. Qui, F. Liu, L. Zhao, W. Yang, J. Yao *Langmuir*, 22, 4480 (2006)). Others have utilized Pt NPs coated by physisorbed PDDA (M. Pan, H. L. Tang, S. P. Jiang, Z. Liu *Electrochem. Comm.*, 7, 119 (2005)), which lacks any functional groups capable of covalently binding Pt, in combination with PAA in similar fashion. Crooks and co-workers (H. Ye, R. W. J. Scott, R. M. Crooks *Langmuir*, 20, 2915 (2004)) have described the preparation of dendrimer-encapsulated Pt and Pd nanoparticles, in which metal nanoparticles are stabilized by non-covalent interactions with lone pair electrons from tertiary amines, and their use to fabricate modified electrodes on GCE surfaces. Likewise, Dong and coworkers have utilized Pt NPs stabilized by a physisorbed citrate species, together with cationic cobalt porphyrins (instead of polycations), to fabricate supramolecular electrodes architectures (M. Huang, Y. Shao, X. Sun, H. Chen, B. Liu, S. Dong *Langmuir*, 21, 323 (2005)). More recently, Farhat and Hammond described the preparation of Pt nanoparticles stabilized by physisorbed polyaniline (PANI) (T. R. Farhat, P. T. Hammond *Chem. Mater.*, 18, 41 (2006)), as well as Pt-loaded carbon colloids stabilized by polymers such as polyethyleneimine (PEI), poly(2-acrylamido-2-methyl-1-propane sulfonic acid (PAMPS), PAA, and PDDA (T. R. Farhat, P. T. Hammond *Adv. Func. Mater.*, 16, 433 (2006)), and their use for fabrication of multilayered electrode structures. While the resulting electrodes in these examples have been shown active for the HOR and/or ORR, there are no reports of electrode electrocatalytic efficiencies comparable to those noted here (note Example 23).

Although the use of covalently-bound ligands to stabilize the Pt NPs represents one factor controlling the electrocatalytic activity of composite Pt NP-polyelectrolyte multilayer electrode assemblies, the three-dimensional multilayer architecture can also be important. The use of a LBL multilayered electrode structure confers the ability to tune electrode properties such as porosity/permeability, stability, and conductivity (both electronic and ionic) that can influence the electrocatalytic ability of the electrode assembly. For example, the thickness and porosity of polyelectrolyte multilayer films have long been known to be functions of not only the chemical structures of the component polyelectrolytes, but also the assembly conditions. In particular, the association of ionic components of salts or acids with oppositely-charged functional groups on polyelectrolytes has been postulated to lead to thicker multilayer films during and after multilayer assembly by minimizing, screening, or disrupting electrostatic attractions between oppositely-charged polyelectrolyte functional groups, allowing the polyelectrolytes to adopt coiled rather than linear conformations within the multilayer films. Deposition of film components at elevated temperatures can produce similar effects. Corresponding changes in film permeability associated with polyelectrolyte layer thickness have been observed and, for our composite Pt NP-polyelectrolyte multilayers, provide a convenient means to control both reactant mass transport properties and conductivity (e.g., electron transfer rates) between adjacent layers of Pt NPs within the electrode film.

For multilayers built using properly functionalized components, film stability/durability/adhesion can be enhanced and porosity/permeability can also be controlled via chemical crosslinking of adjacent film layers. For example, Bruening and coworkers have demonstrated that simple heating of PAH-PAA multilayers can lead to partial crosslinking and film stabilization via amide formation during reaction of free carboxylic acid and amine sites, as well as changes in film porosity/permeability (J. L. Stair, J. J. Harris, M. L. Bruening Chem. Mater., 13, 2641 (2001)). Cross linking can also be accomplished by conversion of a portion of the carboxylic acid groups of the PAA to water soluble N-hydroxysuccinimide esters, as is well known to organic chemists, prior to use of the polyelectrolyte to fabricate the multilayer. During or after multilayer fabrication, reaction of the active ester with a portion of the primary amines from the adjacent PAH layers leads to crosslinking via covalent amide bond formation. Similarly, use of PAA solutions having ~2.5<pH<~4.5 near or below the $pK_a$ of the PAA carboxylate groups (i.e., $pK_a$ ~4.5) yields PAH-PAA multilayers having significant fractions of free —COOH groups within the film. Infusion of water-soluble carbodiimide (CDI)/water-soluble N-hydroxysuccinimide (NHS) solution into such a multilayer can activate the free —COOH groups and promote amide crosslinking with available amine sites. For hydrogen-bonded multilayer systems, such as those formed by interactions between acrylic acid and acrylamide functionalized species, thermal crosslinking leading to imidization to stabilize the resulting films is also possible. Photochemical crosslinking reactions can also be used with properly structured multilayer films; for example, polycationic diazo resins are well known to covalently crosslink with polyacrylate films during UV light exposure. For multilayer architectures comprising appropriately functionalized ligand-stabilized Pt NP and polyelectrolyte components, such as Pt NPs stabilized by the covalently-bound carboxylic acid-functionalized TPPTC ligand (note FIG. 4) and PAH or PEI polyelectrolyte layers, similar crosslinking reactions are available as desired to control adhesion, durability, stability, and porosity/permeability of the multilayer electrode architecture.

The conductivity of the electrode assembly can also be controlled via the selection and nature of the material comprising the layer separating the ligand-stabilized Pt NPs in our films. For example, incorporation of an electronically conducting polymer such as PANI into films can improve electronic conductivity relative to the example using PAH shown in FIG. 1. Likewise, polyelectrolyte ionomers such as Nafion® or PAMPS can improve ionic conductivity of multilayer films. For example, the incorporation of Nafion® in our films permits the tuning of ionic/electronic conductivity as described in Example 31 below relative to the PAH example illustrated in FIG. 1. The incorporation of extraneous ions from salts or acids within the polyelectrolyte, as described above, can also affect conductivity and electrode performance in this regard. The presence of readily oxidized anions, such as bromide or iodide, in the anodic compartment of a PEM fuel cell must also be avoided, as these species will also curtail reactivity and power output. Preferred salts and acids useful during the fabrication of the multilayer and/or in the fluid phase during the operation of the resulting electrode are those not readily reduced of oxidized by virtue of the magnitude of their inherent electrochemical potentials and/or kinetic limitations on their electron transfer reaction rates under the conditions at which the electrode operates. For example, perchlorates satisfy these constraints and are preferred ionic species for our electrode systems. Likewise, other ions having no readily accessible electrochemical reactivity at the electrochemical potential regions appropriate for oxidation of methanol (i.e., MOR; DMFC) or hydrogen (i.e, HOR; HFC) and the reduction of oxygen (i.e., ORR; both DMFC and HFC), such as triflate, tetrafluoroborate, and hexafluorophosphate can also be used.

Multilayer electrode architectures useful for PEM fuel cells and related applications can also be fabricated according to our methods using ligand-stabilized Pt NPs in combination with conductive materials other than polyelectrolytes. For example, conductive colloids or nanoparticles stabilized by physisorbed charged materials such as citrate, ascorbate, or surfactants such as cetylammonium chloride or sodium lauryl sulfate can be employed with oppositely-charged ligand-stabilized Pt NPs to fabricate multilayer electrode architectures. Examples of useful electrodes fabricated in this manner include multilayer films comprising oxidized carbon colloids stabilized by a polycationic PDDA coating (T. R. Farhat, P. T. Hammond Adv. Func. Mater., 16, 433 (2006)) as one component with any of the anionic ligand-stabilized Pt NPs shown in FIG. 4. A more preferred method, providing good electrode structural stability and conductivity, utilizes covalent interactions between the peripheral functional groups of the ligands coordinated to the Pt NPs and a second colloid or nanoparticle component during film fabrication. For example, phosphonate and carboxylate functional groups are well-known to chemisorb to oxides of aluminum, titanium, tin, and various other metals. Consequently, dispersions of conductive oxide nanoparticles, such as those of indium tin oxide, tin oxide, ruthenium oxides, or polyoxometalates stabilized by physisorbed water soluble surfactants or polymers like polyvinylpyrrolidone and related stabilizer materials, can be used as replacements for PAH or other polyelectrolytes in the fabrication of multilayer films according to the scheme in FIG. 1. Successful film fabrication in such cases can require that the peripheral functional group of the ligand-stabilized Pt NP component comprises a group, such as phosphonate or carboxylate, which can chemisorb to the oxide nanoparticle surface at the water-film interface during deposition and partially or completely displace the surfactant or polymer protecting said oxide nanoparticle surface. For example, Pt NPs stabilized by coordinated TPPTP and TPPTC ligands (note FIG. 4) are preferred for multilayer film fabrication in this manner.

Simple metal ions and complexes having multiple sites capable of interacting via covalent bond formation, hydrogen bond formation, and/or attractive electrostatic interaction with the peripheral functional groups present on the ligands coordinated to the Pt NPs can also be used for multilayer film fabrication. For example, Zr(IV) ions are capable of strongly binding multiple phosphonate groups and multilayered films comprising Zr(IV) and organic residues containing phosphonate groups have been previously reported. Other high-valent ions, such as Al(III) and Fe(III), also strongly bind phosphonate residues. Other metal ions that bind strongly to materials having multiple available phosphonate, as well as carboxylate and sulfonate, groups useful for our invention have been identified by Rivas and coworkers in literature publications, the contents of which are incorporated in their entirety herein (B. L. Rivas, E. Pereira, P. Gallegos, D. Homper, K. E. Geckeler *J. Appl. Polym. Sci.*, 92, 2917 (2004)). Consequently, solutions containing simple metal ions such as Zr(IV) or Al(III) can be used as replacements for PAH or other polyelectrolytes in the fabrication of multilayer films according to the scheme in FIG. 1. Successful film fabrication in such cases can require that the peripheral functional group of the ligand-stabilized Pt NP component comprises a group, such as preferably phosphonate or carboxylate, which can strongly bind via covalent, electrostatic, and/or hydrogen bonding modes to available sites on the metal ion at the water-film interface during deposition of each film layer. Metal ions and complexes useful during the fabrication of the electrode multilayer architecture in this manner are those that strongly interact with the peripheral functional groups on the ligands stabilizing the Pt NPs and comprise two general classes. The first class includes bridging ions such as Al(III) and Zr(IV), which are not readily reduced or oxidized by virtue of the magnitude of their inherent electrochemical potentials and/or kinetic limitations on their electron transfer reaction rates. These types of ions function primarily as adhesive layer materials binding adjacent layers of ligand-stabilized Pt NPs together within the electrode assembly. The second class of bridging ions are those such as Fe(III) and Cu(II), which exhibit readily accessible reduction and/or oxidation potentials in solution, and can therefore affect film conductivity by functioning as electron-hole conduction paths between adjacent Pt NPs layers whenever the operating potential of the electrode reaches or exceeds the redox potential of said bridging metal ion. In these cases, the presence of the redox-active metal ion in the electrode multilayer structure provides an additional factor for tuning the electrocatalytic and other physicochemical properties of the resultant multilayer electrode assembly.

Multilayer electrode architectures fabricated as described herein function as efficient electrocatalysts, particularly for the HOR and ORR important for HFCs. For example, for multilayer assemblies fabricated using ~1.7 nm diameter TPPTP-stabilized Pt NPs and PAH component layers on glassy carbon rotating disk electrode (RDE) surfaces modified with covalently-grafted protonated aminophenyl groups, fully mass-transport limited kinetics for hydrogen oxidation are obtained in a film containing just three layers of TPPTP-Pt NPs at a total Pt loading of 4.2 µg/cm$^2$. Complete reduction of oxygen by four electrons is achieved with four layers of TPPTP-Pt NPs and a total Pt loading of 5.6 µg/cm$^2$. A maximum current density for oxygen reduction is reached with films containing five Pt NP layers, corresponding to a loading of 6.6 µg Pt/cm$^2$ and resulting in a mass-specific activity, $i_m$, of 0.11 A/mg$_{pt}$ at 0.9 V vs. a reference hydrogen electrode (R.H.E.). This activity is comparable to the state-of-the-art $i_m$ of 0.19 A/mg$_{pt}$ at 0.9 V reported for conventional Vulcan carbon-supported Pt (46% Pt—C)HFC electrodes (H. A. Gasteiger, S. S. Kocha, B. Sompalli, F. T. Wagner *Appl. Catal. B-Environ.*, 56, 9 (2005)). Although the multilayer electrodes are fabricated on low geometric surface area planar carbon substrates, absolute current densities approaching those observed for thicker, more porous Pt-Vulcan carbon fuel cell electrodes can be achieved by judicious choice of the multilayer components and deposition conditions. Current densities can be further increased through the use of conductive, mesoporous, high surface area carbon, semiconductor, or metal foams as electrode supports.

Fabrication of MEAs using the multilayer electrode architectures described herein can be accomplished through either of two primary routes. In the first, electrodes functioning as anode and cathode are separately fabricated on porous, conductive substrates such as carbon via the LBL deposition method according to the general scheme shown in FIG. 1. The resulting electrodes are then pressed to contact each side of a Nafion® ionomer membrane, such that the multilayer film lies between the conductive substrate and ionomer membrane in each case, to complete the MEA required for the PEM fuel cell. For a DMFC, use of a Nafion® ionomer membrane onto which a multilayer comprising alternating layers of PDDA and PSS or PDDA and poly(1-(4-(3-carboxy-4-hydroxyphenylazo)benzene sulfonamido)-1,2-ethanediyl, sodium salt (PAZO) has been deposited improves power output ~42% by reducing methanol fuel crossover and is therefore preferred over an unmodified Nafion® ionomer membrane. MEAs can also be fabricated by multilayer deposition according to the general scheme shown in FIG. 1 using a modified or unmodified Nafion® ionomer membrane, as appropriate, as the substrate. Deposition of Pt NP containing multilayers on both sides of the ionomer membrane simultaneously fabricates both electrodes. The MEA is completed by contacting the multilayers present on both sides of the ionomer membrane by a conductive, porous, support comprising carbon or a related material. Because a multilayer electrode architecture containing 6 layers of 1.7 nm diameter TPPTP-stabilized Pt NPs and PAH is only ~20 nm thick, the resulting MEAs benefit from generally lighter weight, smaller size, and improved flexibility, which are especially desirable for portable power applications, compared to conventional Pt-Vulcan carbon analogs.

Having described the invention, the following examples are given to illustrate specific applications of and provide a better understanding of the invention. These specific examples are not intended to limit the scope of the invention described in this application.

EXAMPLES

Materials: Hydrogen hexachloroplatinate(IV) hexahydrate (H$_2$PtCl$_6$.6H$_2$O, Strem), perchloric acid (G F Smith), p-aminophenyltrimethoxysilane (APHS, Gelest, Inc.), tris(3-sulfonatophenyl)phosphine (TPPTS, Strem), poly-2-vinyl-pyridine (Linear Polymer Inc.; average molecular weight ~40,000 g/mole; Lot #09), and Sephadex LH-20 (Amersham Bioscience) were used as received. Tetrabutylammonium tetrafluoroborate (TBA$^+$BF$_4^-$), tetrabutylammonium bromide (TBA$^+$Br$^-$), acetonitrile (ACN, Sure/Seal™), 2-(N-morpholinoethane)sulfonic acid (MES), hydrochloric acid (37% weight), methanol, ethanol, isopropanol, poly(allylamine hydrochloride) (PAH, average molecular weight 15,000 g/mol, lot #01916BC), poly(allylamine hydrochloride) (PAH, average molecular weight range 8,500-11,000 g/mole, lot #TG123713MG), potassium chloride, sodium chloride, sodium perchlorate, FeSO$_4$.7H$_2$O, Fe(NH$_4$)$_2$SO$_4$, CaCl$_2$, Eu(NO$_3$)$_3$, NiSO$_4$, CuCl$_2$, and CoSO$_4$, polyaniline (PANI, emeraldine base, molecular weight 10,000 g/mole; lot number 15214 MB), and Nafion® (10% weight dispersion in water; ρ=1.05 g/mL; lot number 02721TC) were A.C.S. Reagent Grade or better and were used as received from Aldrich Chemical Company. Tris(4-phosphonatophenyl) phosphine (TPPTP), tris(4-carboxyphenyl)phosphine (TPPTC) (T. L. Schull, S. L. Brandow, W. J. Dressick *Tetra-*

*hedron Lett.*, 42, 5373 (2001)), and (4-nitrophenyl)diazonium tetrafluoroborate were synthesized according to published procedures. N-(2-aminoethyl)-3-aminopropyltrimethoxysilane (EDA, Gelest, Inc.) was purified by vacuum distillation (140° C., 14 mm Hg) and stored under a dry nitrogen atmosphere until needed for use. Optical grade polished fused silica (FS) slides (25 mm×25 mm×1 mm) were purchased from Dell Optics Inc. All aqueous solutions were prepared with water purified by a Millipore Milli-Q Plus system to 18.2 MΩ-cm. Spectra/Pore® Biotech Cellulose Ester (CE) Dialysis Membrane (molecular weight cut-off ~500 g/mole; flat width ~16 mm; diameter ~10 mm; volume/length ~0.81 mL/cm) was used as received from Spectrum Labs Inc.

Nuclear Magnetic Resonance Spectroscopy (NMR): Solution $^1$H and $^{31}$P NMR spectra were recorded on a Bruker DRX 400 spectrometer and referenced to residual $^1$H signals of the deuterated water ($^1$H) or external $H_3PO_4$ ($^{31}$P). All $^{195}$Pt solid-state Nuclear Magnetic Resonance (ssNMR) studies were performed at room temperature (298K) at 11.7 T on a Bruker Digital DMX500 spectrometer interfaced with a Silicon Graphics console running the XWINNMR 2.6 software package. Approximately 100 mg of the Pt NP solid of interest was loosely packed into a 4 mm sample vial under ambient conditions. Data was acquired on a point by point basis under static conditions using a simple Hartman-Hahn solid state echo pulse sequence with a recycle delay of 25 ms and a τ of 20 µs.

X-ray Photoelectron Spectroscopy (XPS): XPS spectra were acquired using a Thermo VG Scientific Escalab 220i-XL with a monochromatic Al Kα source. Carbon paper modified with negatively charged ligand-stabilized Pt NPs, as described in the Example 9 below, was dried overnight before placing it in the UHV chamber. Measurements were performed at room temperature with a base pressure of $1\times10^{-9}$ Torr. Survey scans were performed from 0 to 1400 eV binding energies and 100 eV pass energy. High-resolution scans of Pt 4f and 4d, O 1s, C 1s, N 1s, and P 2p were acquired with 15-20 eV windows and 20 eV pass energy. The core-level binding energies were calibrated to the C 1 s peak at 284.4 eV. The high resolution spectra were fit using Unifit software (R. Hesse, T. Chesse, R. Szargan Fresenius' *J. Anal. Chem.*, 365, 48 (1999)).

Transmission Electron Microscopy (TEM): High resolution TEM and electron diffraction were performed on a JEOL JEM-2200FS microscope operating at a 200 kV accelerating voltage. Samples were prepared by placing a drop of an aqueous TPPTP-Pt NP dispersion (0.25 mg/mL in the presence of a surfactant, ca. 10 mg tetrabutylammonium bromide) on a 300-mesh copper grid coated with continuous carbon film (Ted Pella). The samples were dried overnight in vacuo. Images were recorded using a Gatan Ultascan CCD camera, and the camera constants were calibrated using gold lattice images. Pt core diameters were measured using the Image Processing Tool Kit plug in for Photoshop.

Extended X-ray Absorption Fine Structure (EX4FS): EXAFS measurements of TPPTP-Pt NPs were taken in fluorescent mode at beamline X11B at the National Synchrotron Light Source (NSLS) at Brookhaven National Laboratory. The spectra were collected on a monolayer of TPPTP-Pt NPs deposited on grafted carbon paper as described below in the *Electrochemistry Section*. Data analysis was performed with the IFEFFIT program (B. Ravel, N. Newville *J. Synch. Rad.*, 12, 537 (2005)) using an R range of 0.5 to 2.8 Å and the Fourier transform $k^3$ (2<k<11) for the Pt—Pt and Pt—O scattering paths. The data from k>11 was not useful due to background noise in the spectra from these low-platinum films. The atomic EXAFS contribution below R=3 Å is reduced by adjusting the $R_{bkg}$ parameter in the Athena code of the IFEFFIT package.

UV-Visible Spectroscopy: UV-vis spectra, corrected for baseline variations using EDA-coated fused silica reference slides were acquired using a Varian Cary 5000 double beam spectrophotometer. EDA self-assembled monolayers were chemisorbed onto freshly cleaned fused silica slides using the literature procedure (M-S. Chen, S. L. Brandow, C. S. Dulcey, W. J. Dressick, G. N. Taylor, J. F. Bohland, J. H. Georger, Jr., E. K. Pavelchek, J. M. Calvert *J. Electrochem. Soc.*, 146, 1421 (1999)).

Multilayer Electrode Architecture Fabrication: Multilayers were fabricated on the EDA-coated fused silica slides and glassy carbon electrodes (GCEs) functionalized with monolayers of aminophenyl (APh) groups as described in detail in the examples below. A programmed Strato-Sequence VI® robot dipcoater (nanoStrata Inc.) was used to deposit each layer of the film on the EDA-coated fused silica slides. The treated slides were automatically triple rinsed using DI water (1 min per rinse cycle) and dried in a filtered $N_2$ gas stream (30 s) following deposition of each film layer unless noted otherwise. Deposition times on the EDA-coated fused silica slides were typically 120 min for the ligand-stabilized Pt NPs dispersion and 30 min for the oppositely-charged polyelectrolyte solution. APh-modified GCEs were similarly coated by sequentially hand dipping the substrate in unstirred Pt NP dispersions and oppositely-charged polyelectrolyte solutions, with triple aqueous rinses of the GCE between immersions unless noted otherwise. Deposition times for the Pt NP dispersions on GCEs were increased to ~24 h, whereas immersion in the oppositely-charged polyelectrolyte solution remained at 30 min. The composition of the multilayer so obtained is indicated by the shorthand notation, SUB-SAM/L-Pt NP/(PE/L-Pt NP)$_{n-1}$, where "SUB" indicates the substrate material (i.e., fused silica, FS, or the glassy carbon electrode, GCE), "SAM" indicates the type of monolayer grafted to the substrate (i.e., EDA or ganosiloxane for the FS slide and APh monolayer for the GCE), "L" indicates the specific stabilizing ligand covalently coordinated to the Pt NP surface (e.g., note FIGS. 3 and 4), "PE" indicates the abbreviation of the specific polyelectrolyte (e.g., note FIG. 2) used with the L-Pt NPs to form the multilayer, and "n" is the total number of L-Pt NP layers present following n−1 PE/L-Pt NP treatment cycles of the monolayer-functionalized substrate coated with the initial L-Pt NP layer, "SUB-SAM/L-Pt NP". Specific treatment conditions and notations for multilayer identification are given in the relevant examples below.

Electrochemistry. HOR and ORR kinetics were evaluated for the multilayer electrode architectures prepared on GCEs using a rotating disk electrode (RDE) method. Aqueous 0.1 M perchloric acid was used as electrolyte, a hydrogen impregnated palladium bead (Pd/$H_2$) as the reference electrode, and Au foil as the counter electrode. The RDE cell was a 250-mL volume glass cell with a jacket for temperature control. The temperature was maintained at 60° C. with a circulating bath of 1:1 (v:v) mixture of ethylene glycol and water. Electrolyte solutions were saturated with $H_2$ or $O_2$ for the HOR and ORR evaluation, respectively, by bubbling gas into the solution through medium porosity glass frits. Electrode rotation rates were controlled using a Pine Instruments AFMSRX rotator.

Electrode potentials were applied using an AUTOLAB™ potentiostat. Computer control of the potentiostat and data acquisition was performed with GPES™ electrochemical software. The current density was calculated using the geometric surface area of the glassy carbon electrode disk (0.196 cm$^2$). The Pd/H electrode was corrected to a reversible hydrogen electrode (RHE) by measuring the potential at which a Pt||Pt cell exhibited zero current under hydrogen in the electrolyte. Platinum loadings were determined for each multilayer-coated GCE after electrochemical measurements using Rutherford backscattering spectroscopy (Evans Analytical Group, Sunnyvale, Calif.) on the glassy carbon electrode directly.

Example 1

Preparation of Preferred Pt NP Starting Material

This example describes the synthesis of the glycol-coated Pt NPs most useful for preparation of ligand-stabilized Pt NPs useful for our invention.

Pt nanoparticles stabilized by glycol and OH$^-$ were prepared according to a previously reported method (Y. Wang, J. Ren, K. Deng, L. Gui, Y. Tang *Chem. Mater.*, 12, 1622 (2000)). Briefly, under an inert atmosphere, an ethylene glycol solution of $H_2PtCl_6 \cdot 6H_2O$ (50 mL, 1.93 mmol) was added to an ethylene glycol solution of NaOH (50 mL, 0.5 M). The resulting orange-yellow solution was heated to 160° C. for 3 h under reflux. A transparent brown Pt colloidal solution was obtained and stored under $N_2$.

Example 2

Preparation of TPPTP-Stabilized Pt NPs

This example describes the preparation of ~1.7 nm diameter Pt NPs stabilized by covalently coordinated tris-4-phosphonatophenyl phosphine (TPPTP, note FIG. 4) ligands on the NP surface.

The glycol-stabilized Pt NPs (30 mL, 0.579 mmol Pt) from Example 1 were isolated as a brown solid via precipitation with 1.0 M HCl until a pH value of less than 4 was reached. After centrifugation (3000 rpm for 10 min) to separate the precipitate from the supernatant, the isolated Pt NPs were dispersed in a minimal amount of acetone and precipitated with 1.0 M HCl, followed by centrifugation to isolate the brown Pt NPs. This was repeated three times to remove excess ethylene glycol. The isolated Pt NPs were dispersed in degassed acetone (5 mL) and added to a solution of TPPTP (0.153 g, 0.290 mmol) in degassed water (15 mL) resulting in a homogenous brown dispersion. This dispersion was mechanically stirred under $N_2$ for 1 h to allow for partial exchange of the TPPTP ligand at the platinum surface. The solvent mixture was then removed in vacuo and degassed water (~10 mL) was added, resulting in a transparent brown Pt colloidal dispersion which was left stirring overnight under $N_2$ atmosphere. The next day, ~0.50 mL of a solution of 30% weight NaOD in $D_2O$ was added to the dispersion to precipitate a brown solid that was collected by centrifugation, resuspended in ~10-15 mL $H_2O$, and allowed to stir under $N_2$ atmosphere to complete the ligand exchange. Complete exchange of the TPPTP ligand at the Pt NP surface required 2-3 days. The TPPTP ligand is known to coordinate to low-valent transition metals exclusively through the phosphine phosphorus, and the ligand exchange reaction can be monitored by solution $^{31}$P NMR spectroscopy. Coordination of the TPPTP ligand to the platinum nanoparticle is evidenced by the disappearance of the resonance for free phosphine of TPPTP at −6.5 ppm and a new resonance appearing downfield at 3.2 ppm. This is similar to the behavior observed for phosphine ligands coordinated to palladium NPs. However, no $J_{Pt-P}$ coupling is observed, which is in contrast to the findings of Chaudret, et al., who observed complex multiplets in the $^{31}$P NMR spectrum and claim a $^1J_{Pt-P}$ value of 5130 Hz for triphenylphosphine bound to 1.3 nm Pt clusters (C. Amiens, D. de Caro, B. Chaudret, J. S. Bradley, R. Mazel, C. Roucau *J. Am. Chem. Soc.*, 115, 11638 (1993)). Once no free TPPTP ligand was observed by $^{31}$P NMR, the solvent was removed in vacuo. To remove the excess free TPPTP oxide formed during the ligand exchange process, the crude material was re-dispersed in a minimal amount of water and purified by gel filtration chromatography using Sephadex LH-20. The brown-yellow layer was collected, and the water was removed in vacuo to give a black solid (0.117 g) which is completely redispersible in water. Multiple elemental analyses by ICP (Robertson Microlit Laboratories) showed a Pt metal content in the range of 66.08 to 58.25% and P content of 5.91 to 4.47% corresponding to a Pt:TPPTP ratio of ~7:1.

Example 3

Stability of TPPTP-Pt NPs

This example demonstrates the stability of the TPPTP-Pt NPs in aqueous solutions used for the fabrication of the multilayer electrode architectures.

The stability of the TPPTP-Pt NPs prepared in Example 2 is demonstrated via $^{31}$P NMR spectroscopy by the absence of fast TPPTP ligand exchange and the inability to displace TPPTP coordinated to the Pt NP surface by alkylthiol ligands. For example, addition of free TPPTP (10 mg) to a dispersion of TPPTP-Pt NPs (20 mg) in $D_2O$ (1 mL) causes a shift of the bound TPPTP $^{31}$P resonance from 3.2 to 0.5 ppm, but no line broadening for either the free or bound phosphine resonance is observed. Addition of another 10 mg of TPPTP results in no change in the $^{31}$P NMR spectrum. Heating the solution to 80° C. resulted in no line broadening of either the free TPPTP or TPPTP-Pt NPs resonance, consistent with a lack of TPPTP ligand exchange for these TPPTP-Pt NPs. In a second ligand exchange experiment, we attempted to displace TPPTP bound to the Pt NP surface by addition of an alkylthiol ligand, 2-mercaptoethanol (0.2 mL, ca. 2500 equivalents to TPPTP), to a dispersion of TPPTP-Pt NPs (20 mg) in 0.7 mL of $D_2O$. After six days, no displaced TPPTP was observed by $^{31}$P NMR, indicating that the TPPTP is tightly bound to the nanoparticle surface.

Example 4

Conformational Mobility Within TPPTP Ligand Coordinated to Pt NPs

This example shows that TPPTP ligand coordinated to the Pt NP surface retains its conformational mobility.

Figure 6:
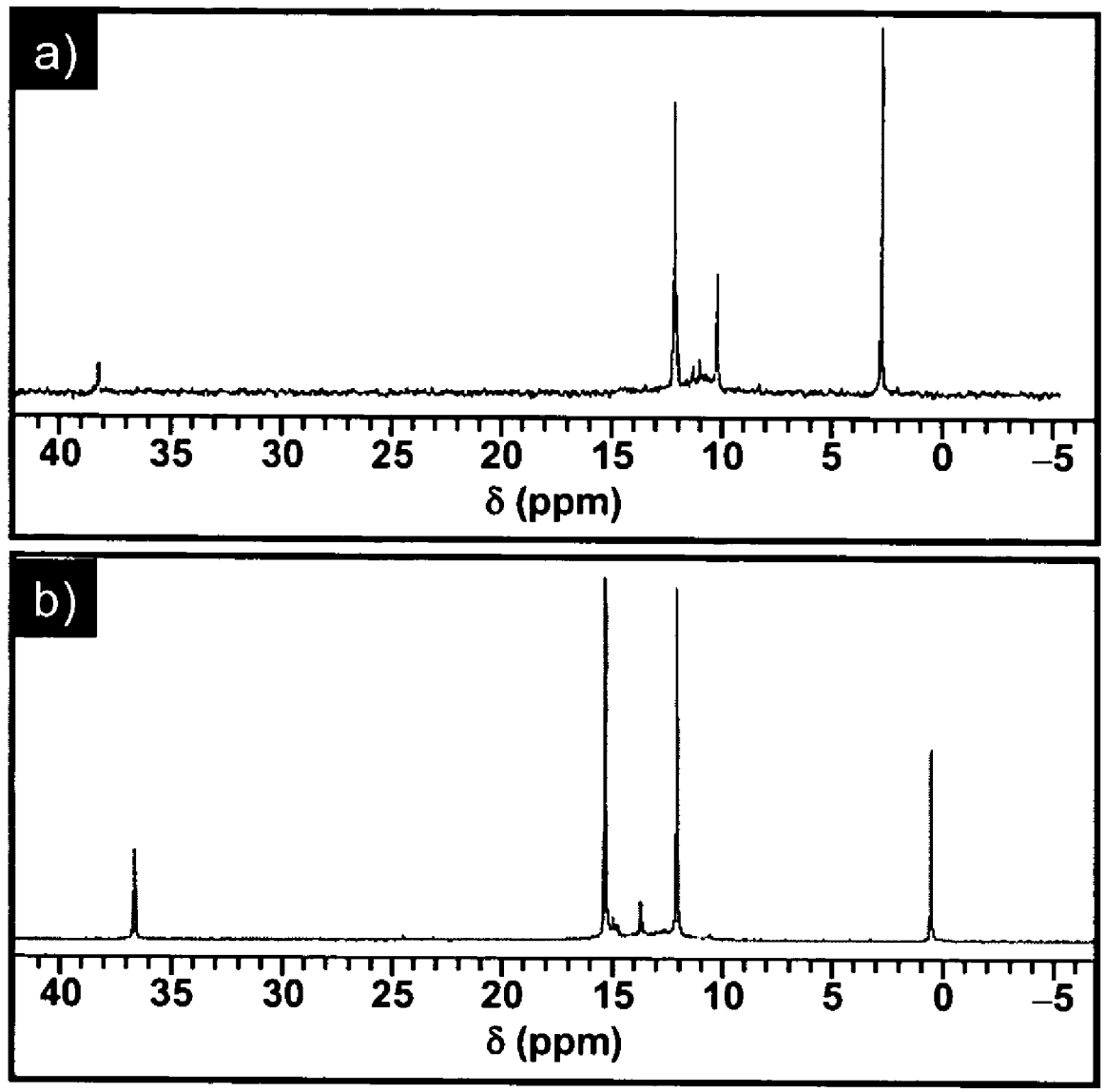
FIG. 6: $^{31}P$ NMR Spectra of TPPTP-Pt NP Dispersions in $D_2O$. a) Fresh; b) 3 weeks old.

A dispersion of the TPPTP-Pt NPs isolated in Example 2 in $D_2O$ (~20 mg/mL) exhibits the $^{31}$P NMR spectrum shown in FIG. 6a. The sharp peak attributed to the phosphine P resonance of the coordinated TPPTP is observed at 2.89 ppm. The corresponding resonance due to the phosphonate P atoms is located at 12.2 ppm. Peaks at 10.14 ppm and 38.22 ppm are assigned to TPPTP oxide by comparison with an authentic sample. Integration of the phosphine and phosphonate peaks for the TPPTP ligand coordinated to the Pt NPs yields a $PO_3^{2-}$:P ratio of 1:1, rather than the 3:1 ratio expected from the TPPTP ligand structure (note FIG. 4). The spectrum of an identical solution stored at room temperature for ~3 weeks is shown in FIG. 6b. Peaks at 12.12 ppm and 36.71 ppm are again assigned to TPPTP oxide. The position of the phosphine P peak for the coordinated TPPTP ligand has shifted to 0.60 ppm. In addition, the corresponding phosphonate P peak has now coalesced and appears as the expected singlet at 15.37 ppm. In addition, integration now yields a $PO_3^{2-}$:P ratio of 2.78:1, as expected based on the TPPTP ligand structure in FIG. 4. The behavior shown in FIG. 6 is consistent with the presence of phosphonate P atoms in multiple chemically and/or magnetically non-equivalent environments, at least some of which can quench the $^{31}P$ resonance signal of the phosphonate P, immediately following ligation of TPPTP by the Pt NP, with subsequent conformational relaxation to a single average chemically and magnetically equivalent environment with time.

Example 5

Preparation of TPPTC-Stabilized Pt NPs

This example describes the preparation of 1.7 nm diameter Pt NPs stabilized by covalently coordinated tris-4-carboxyphenyl phosphine (TPPTC, note FIG. 4) ligands on the NP surface.

An aqueous solution was prepared by suspending 0.114 g tris-4-carboxyphenyl phosphine (TPPTC) ligand in 5 mL of $N_2$ degassed water and adding 30% weight NaOD (aq) solution dropwise until all the solid had dissolved (3-4 drops were required). The glycol-stabilized Pt NPs (30 mL, 0.579 mmol Pt) from Example 1 were isolated and dispersed in 15 mL acetone, as described in Example 2. The glycol-stabilized Pt NP dispersion in acetone was then slowly added to the aqueous TPPTC solution and the resulting dispersion was stirred for 1 h under $N_2$ atmosphere. The NPs were then isolated by centrifugation (3000 rpm for 10 min), re-dispersed in 20 mL water, and stirred under a $N_2$ atmosphere for 3 days to complete the ligand exchange reaction. The TPPTC—Pt NPs obtained were purified by chromatography using Sephadex LH-20, as described for the TPPTP-Pt NPs in Example 2. The purified TPPTC—Pt NPs (0.144 g) exhibited a $^{31}P$ NMR phosphine resonance at 2.70 ppm.

Example 6

Preparation of TPPTS-Stabilized Pt NPs

This example describes the preparation of ~1.7 nm diameter Pt NPs stabilized by covalently coordinated tris-3-sulfonatophenyl phosphine (TPPTS, note FIG. 4) ligands on the NP surface.

The preparation of TPPTS-Pt NPs was carried out as described in Example 2 using tris-4-sulfonatophenyl phosphine (TPPTS) ligand in place of TPPTP ligand with one change in procedure. The step involving treatment of the Pt NP dispersion with 30% weight NaOD solution in $D_2O$ was not required in this case to enhance the binding rate of the TPPTS ligand to the Pt NP surface and was omitted. The TPPTS-Pt NPs obtained (0.104 g) exhibited a $^{31}P$ NMR phosphine resonance at 0.52 ppm.

Example 7

Steric Hindrance and Basicity Considerations Regarding the Preparation of Pt NPs Stabilized by Coordinated Triaryl- and Trialkylphosphine Ligands This example illustrates limitations regarding steric hindrance and basicity of triarylphosphines and trialkylphosphines, respectively, of ligands for stabilization of Pt NPs.

The glycol-stabilized Pt NPs prepared in Example 1 were separately treated with various phosphines (FIG. 5) having increased steric hindrance (i.e., TXPTS) or basicity (i.e., DCETMA and TCEP) compared to the triarylphosphines shown in FIG. 4. The general procedure was to combine an acetone solution of the glycol-stabilized Pt NPs with an aqueous solution containing 0.5 equivalents (to Pt) of the appropriate water-soluble phosphine under $N_2$ atmosphere. The exchange reaction associated with binding of the phosphine ligand to the Pt NP surface was followed by $^{31}P$ NMR. Coordination of the ligand to the metal nanoparticles, if it occurred, was evidenced by the disappearance of the resonance of the free phosphine and a new resonance appearing downfield, as observed for TPPTP in Example 2. Neither the basic trialkylphosphine ligand, TCEP, nor the sterically hindered triarylphosphine ligand, TXPTS, showed coordination to the NPs; only phosphine oxide formation was observed. The basic trialkylphosphine ligand, DCETMA, appeared to initially coordinate to the metal; the original resonance at −7 ppm moved to 34 ppm, but this complex quickly decomposed to platinum black and phosphine oxide after isolation of the solid and reconstitution in $D_2O$.

Example 8

Sensitivity of Electronic States of Pt NPs to Ligand Environment

This example demonstrates the ability to alter the electronic states of Pt NPs using ligands.

TPPTS-stabilized Pt NPs were prepared by addition of solid $K_2PtCl_6$ (1 equivalent) to ~10 mL of a stirred aqueous solution containing $NaBH_4$ (~10 equivalents) and TPPTS (0.2 equivalents) under $N_2$ atmosphere. After ~12 h, the mixture was centrifuged and then filtered (0.4 μm porosity filter) to remove the Pt black that had formed. Addition of 50 mL ethanol to the filtrate precipitated a brown-black solid, which was isolated by centrifugation. The solid was re-dispersed in ~5 mL water and the precipitation with ethanol was repeated twice. The solid was then re-dispersed in ~3 mL water, purified via Sephadex LH-20 chromatography, and isolated as described in Example 2 for the TPPTP-Pt NPs. The TPPTS-Pt NPs so obtained were dispersed in $D_2O$ (~20 mg/mL) and a $^{31}P$ NMR spectrum was obtained. A single phosphine P resonance was observed at 0.8 ppm. A second NMR spectrum was obtained following addition and dissolution of 40 mg solid KCl to the sample. The phosphine P peak for this sample was shifted to 3.3 ppm. No other $^{31}P$ peaks, such as those due to free TPPTS ligand (~5.78 ppm) or TPPTS phosphine oxide (34.7 ppm) indicative of decomposition of the TPPTS-Pt NPs, were observed. The TPPTS-Pt NP dispersion was then subjected to a second Sephadex LH-20 chromatography to separate the NPs from the excess KCl and re-dispersed in $D_2O$ before another $^{31}P$ NMR spectrum was recorded. The sample again showed the original resonance at 0.8 ppm, indicative of a reversible effect of the KCl ligand. This behavior is consistent with a reversible interaction of the KCl with available sites on the Pt NP surface, leading to a perturbation of the energy levels of the Pt NP as measured by the shift in the $^{31}$P NMR signal of the bound TPPTS ligand.

Example 9

Method for Chemically Grafting Monolayer Films Containing Aminophenyl Functional Groups to a Carbon Surface This example describes the procedure for electrochemically grafting a film containing aminophenyl functional groups to the surface of a conductive carbon substrate, such as a GCE or carbon paper.

The surface of the glassy carbon electrode (GCE) or conductive carbon paper was grafted with a monolayer of 4-aminophenyl (APh) functional groups according to published procedures (M. Delamar, R. Hitmi, J. Pinson, J. M. Savéant *J. Am. Chem. Soc.*, 114, 5883 (1992)). Briefly, glassy carbon disk electrodes (5.0 mm diameter, 0.196 cm², Pine Instruments), polished to a mirror finish with 0.1 μm alumina powder on a polishing cloth (Buehler), or pieces of conductive carbon paper were suspended under Ar in a solution of freshly prepared 5 mM (4-nitrophenyl)diazonium tetrafluoroborate and 0.1 M TBA$^+$BF$_4^-$ in acetonitrile. Electrolysis at −1.1 V vs. Ag/Ag$^+$ reference electrode for 10 minutes resulted in the covalent attachment of 4-nitrophenyl functional groups to the electrode surface, as confirmed by the reversible wave observed in the cyclic voltammetry in pure electrolyte. Reduction of the nitro group to an amine was achieved by applying a potential of −1.2 V for 10 minutes in a protic solution (0.1 M KCl in 90:10 water/ethanol), resulting in the formation of APh functional groups on the GCE surface. The APh-modified GCE (GCE-APh) was immersed into a 0.1 M HClO$_4$ solution for 10 minutes to protonate the amine group, resulting in a uniform positively charged surface to which the negatively charged polyelectrolytes or ligand-stabilized Pt NPs can electrostatically bind for multilayer film fabrication.

Example 10

Mode of Binding of TPPTP to Pt NPs

This example demonstrates that the TPPTP ligand binds to the surface of the Pt NPs via coordination of its phosphine P site and confirms the presence of platinum oxide on the Pt NP surface.

Figure 7:
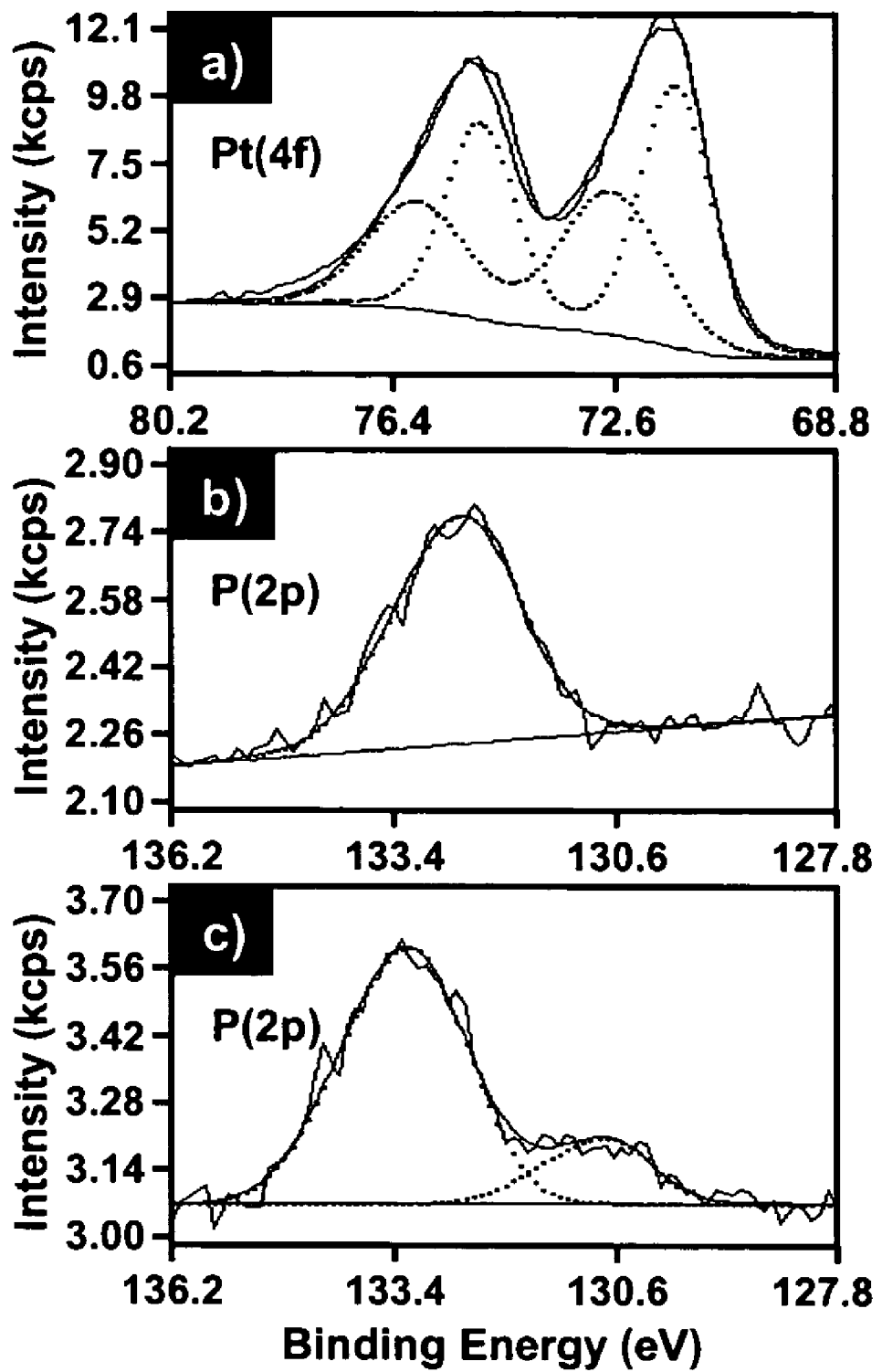
FIG. 7: XPS spectra for TPPTP-Pt NPs on grafted carbon paper showing the (a) Pt 4f region; (b) P 2p core levels. Part (c) shows the P 2p core level of the free TPPTP ligand on grafted carbon paper.

To confirm the platinum-phosphorus interaction of TPPTP-stabilized Pt NPs and the oxidation state of Pt, the TPPTP-Pt NPs were analyzed by X-ray photoelectron spectroscopy. FIG. 7a shows the Pt 4f region of the spectrum before electrochemical measurements which can be deconvoluted into two spin-orbit doublets. The more intense doublet of Pt 4f$_{7/2}$ is measured at a binding energy (BE) of 71.6 eV, and although shifted from bulk platinum metal (Pt 4f$_{7/2}$= 71.12 eV), is characteristic of Pt in the zero-valent state for small platinum nanoparticles. The higher BE component of Pt 4f$_{7/2}$ at 72.7 eV is assigned to Pt$^{II}$ consistent with PtO or Pt(OH)$_2$ on the surface of the nanoparticle.

The P 2p signal of the TPPTP ligand on Pt was also measured (FIG. 7b). Only one spin-orbit doublet was observed at 132.4 eV for both the surface bound phosphine and phosphonate groups of the Pt-bound ligand. This is consistent with a shift of the phosphine P 2p peak to a higher binding energy due to coordination to the platinum metal, resulting from electron donation from the phosphine to the metal. A similar shift has been observed before for 1.3 nm PPh$_3$Pt NPs, where the binding energy of free PPh$_3$ is observed at 130.9 eV, but shifts to 131.8 eV upon coordination to platinum. To determine whether a similar binding energy shift occurs for the Pt-coordinated TPPTP, a monolayer of free TPPTP ligand electrostatically bound to APh-grafted carbon paper was also analyzed by XPS. FIG. 7c shows the P 2p region of the spectrum for free TPPTP, which now shows the expected two spin-orbit doublets at 130.6 eV for the phosphine and 133.0 eV for the three phosphonate groups in a ratio of roughly 1:3, respectively. These results are consistent with the phosphine of the TPPTP ligand coordinated to the surface Pt atoms of the nanoparticle.

Example 11

Size Determination for the TPPTP-Pt NPs

This example shows that the Pt NPs stabilized by coordinated TPPTP ligand have an average diameter of ~1.7 nm.

Figure 8:
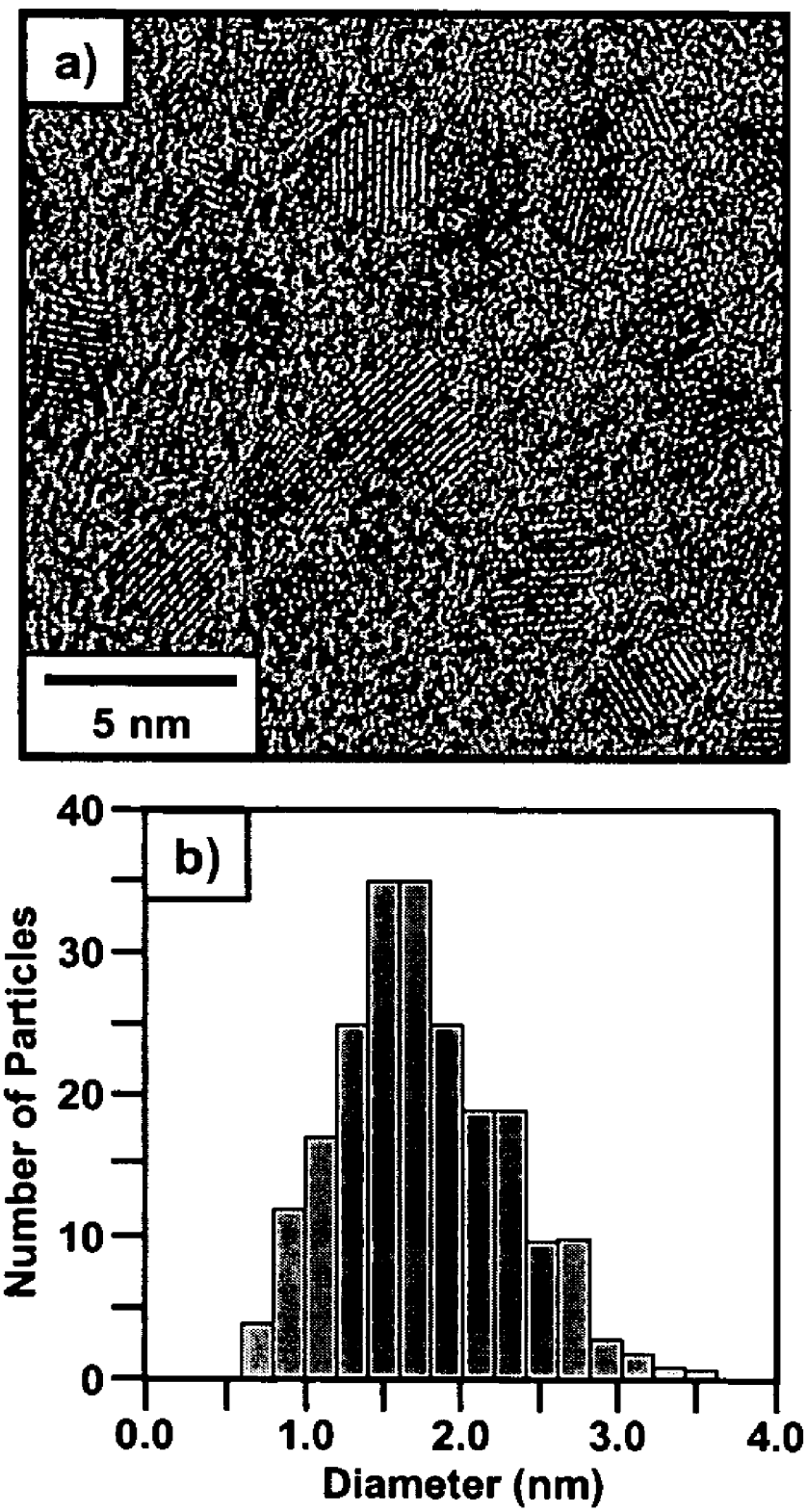
FIG. 8: a) HRTEM of TPPTP-Pt NPs; b) TPPTP-Pt NP size distribution histogram. The average NP size is 1.7 nm±0.5 nm.

FIG. 8a shows a high-resolution TEM image of the isolated TPPTP-Pt NPs prepared in Example 2. The histogram resulting from measuring 214 well-separated particles in FIG. 8b displays a mean particle diameter of 1.7±0.5 nm.

Example 12

Structure Determination for the TPPTP-Pt NPs

This example illustrates the internal crystalline structure of the TPPTP-Pt NPs.

Figure 9:
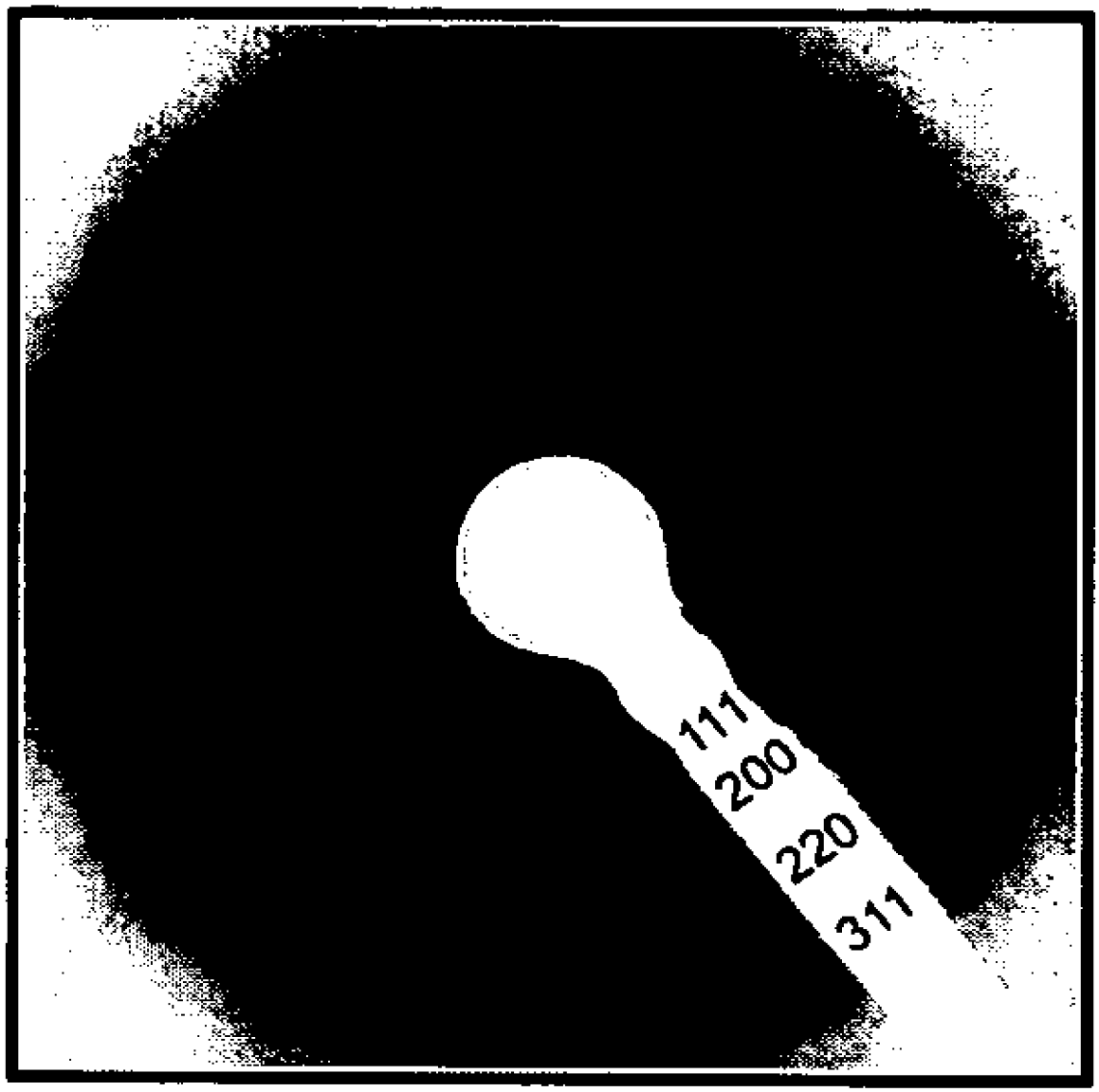
FIG. 9: HRTEM electron diffraction pattern for the TPPTP-Pt NPs.

An electron diffraction pattern of the TPPTP-Pt NPs, determined in conjunction with the TEM particle size measurements from Example 11, is shown in FIG. 9. The electron diffraction pattern exhibits four diffraction rings which are indexed as the d spacings for the (111), (200), (220), and (311) planes of a face centered-cubic platinum structure. This confirms the presence of a crystalline structure for the TPPTP-Pt NPs.

Example 13

Shape Determination for the TPPTP-Pt NPs by EXAFS

This example illustrates the distortion of the Pt NP structure due to changes in the particle energy levels resulting from NP interactions with the coordinated TPPTP ligand.

Figure 10:
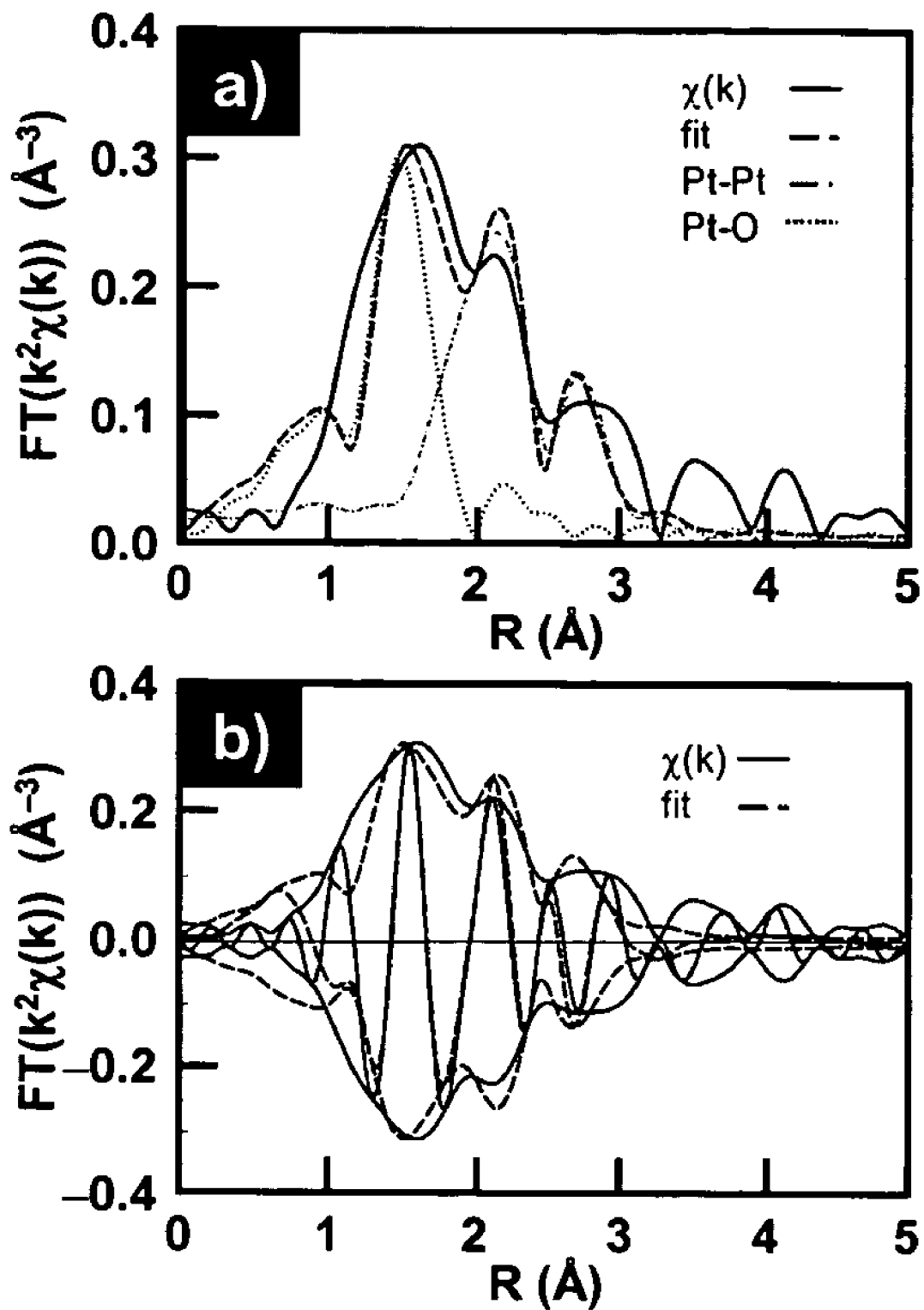
FIG. 10: EXAFS results for TPPTP-Pt NPs. a) R-space fit. Path Pt—Pt: N=4.0, R=2.64 Å, $E_o$=−2.3 eV, $\sigma^2$=0.014 Å$^2$. Path Pt—O: N=1.1, R=1.95 Å, $E_o$=−3.7 eV, $\sigma^2$=0.003 Å$^2$; b) Comparison of two-shell fit and experimental data showing the magnitude and imaginary part of the FT in R space (FT of $k^2\chi$ over the range 2<k<11).

EXAFS analysis gives information concerning atomic interactions with the TPPTP-Pt NPs, as well as additional information about particle size and, together with the TEM results (Example 11) and solid-state NMR results described in Example 14, particle shape. The EXAFS data for the TPPTP-Pt NPs is shown in FIG. 10 and is best fit by the 2-shell interactions of Pt—Pt and Pt—O. FIG. 10a shows the quality of the fit in R-space using the region 1.4<R<3.3 derived from χ(k) data in k-space from 2 to 11 Å$^{-1}$ shown in FIG. 10b. Higher multiple scattering contributions enter above R=3 Å and an atomic EXAFS contribution appears below R=1.4 Å. Table 1 summarizes the parameters corresponding to the best fit of the data in FIG. 10, which corresponds to particle having a 2.65 Å Pt—Pt interaction with a coordination number of N=4.0 and a Pt—O interaction with a bond distance of 1.95 Å and a coordination number of N=1.1.

The small Pt—Pt coordination number gives indirect evidence for the presence of TPPTP ligands bound to Pt metal on the surface of the nanoparticles. The Pt—P contribution could not be modeled directly in the fit with the Pt—Pt and Pt—O because each interaction requires 4 parameters, but only 10 parameters are allowed with the Nyquist theorem. In addition, the 2.5 Å Pt—P contribution is also difficult to separate from the 2.65 Å Pt—Pt contribution because of the weaker scattering signal and the lower number of Pt—P interactions evidenced from the ~7:1 Pt:P ratio obtained

TABLE 1

EXAFS fit parameters.

| Path | N | R (Å) | $E_o$ (eV) | $\sigma^2$ (Å$^2$) |
|---|---|---|---|---|
| Pt—Pt | 4.0 | 2.64 | −2.3 | .014 |
| Pt-O | 1.1 | 1.95 | −3.7 | .003 | from the elemental analyses (note Example 2) and the 1:3 P:PO$_3^{2-}$-ratio for P available to coordinate to the NP surface based on the TPPTP ligand structure (note FIG. 4). Evidence for a Pt—P interaction comes from the somewhat large Debye-Waller factor $\sigma^2$, a measure of structural disorder, which is consistent with strong interaction of the surface atoms with adsorbed molecules, as is the short Pt—Pt bond length (2.65 Å vs.2.78 Å in bulk Pt metal), which tends to decrease with decreasing particle size and interaction with surface-bound molecules. Others have shown that for Ru nanoparticles, 4-nm particle capped with thiols had a lower coordination number than 2 nm particles coated with polyol, due to the disorder introduced by the strong thiol ligands (N. Chakroune, G. Viau, S. Ammar, L. Poul, D. Veautier, M. M. Chehimi, C. Mangeney, F. Villain, F. Fievet *Langmuir*, 21, 6788 (2005)). These EXAFS results suggest that the TPPTP-PT NPs comprise a crystalline Pt core of ~0.5 nm diameter having ~5-7 Pt atoms surrounded by a shell containing Pt atoms and PtO, which is distorted due to strong interactions of the Pt with the coordinated TPPTP ligand.

Example 14

Shape Determination for the TPPTP-Pt NPs by $^{195}$Pt Solid-State NMR

This example demonstrates that the TPPTP-Pt NPs possess flattened or truncated cubooctahedral, rather than spherical, geometries as a result of distortion of the surface Pt atoms by interactions with the covalently coordinated TPPTP ligands.

The degree to which stabilizing ligands or other adsorbate molecules interact with the surface atoms of a platinum particle can also be observed by solid state $^{195}$Pt NMR. Unlike most non-metals, the NMR of a transition metal, such as Pt, reveals a resonance peak whose position is not solely due to chemical shift but also has a contribution from the Knight shift. The Knight shift is due to polarization of the spins of the conduction electrons in the metal, and has the greatest influence on the position of the resulting metal NMR line in most bulk metals.

The Knight shift can be used advantageously to estimate the size of a metal nanoparticle and its interactions with ligands bound to its surface, using a model which we now briefly describe. The percentage of surface atoms, and thus the size of the cluster, can be approximated by the layer model. In the perfect case one assumes that the core of the TPPTP-Pt NP is comprised of platinum atoms arranged in an fcc cubooctahedral pattern. This would suggest that there is a metal core composed of successive shells, or layers, of Pt atoms arranged around a central Pt atom, consistent with the EXAFS observations. The number of shells is determined by how large the metal core diameter is, i.e. the more shells involved, the larger the core diameter. According to the layer model if the diameter of the particle core, "d", is known the total number of atoms, "$N_t$", involved can be approximated by eq. (3):

$$d = a\sqrt[3]{\left(\frac{3N_t}{2\pi}\right)} \quad (3)$$

where "a" is the bulk lattice constant for a Pt atom (0.392 nm). Thus, the number of shells, "n", revealing the number of surface atoms, "$N_s$", can be calculated from eqs. (4) and (5):

$$N_t = (10/3)n^3 - 5n^2 + (11/3)n - 1 \quad (4)$$

$$N_s = 10n^2 - 20n + 12 \quad (5)$$

From these equations it can be found that the smallest possible cluster has two shells; one central atom surrounded by a shell of 12 additional atoms. This gives a total of 13 atoms, 92% of which reside on the surface, and correlates to a 0.72 nm diameter particle. As the NP size increases, the number of shells clearly also increases, with a 4 nm particle having as many as 9 shells.

$^{195}$Pt NMR is a useful probe to distinguish between resonances due to the surface the underlying atoms contained in the various Pt shells. This information can then be used to determine the dispersion, or the percentage of atoms on the surface, and thus estimate the overall particle size. When probing inward from the particle surface through successive layers, a point known as the "healing length" is eventually reached at which surface effects diminish and behavior approaches that of the bulk metal. That is, when moving from the surface to the inner shells the surface NMR peak position "heals" back to the bulk metal peak position, as described by the exponential healing layer model shown in eq. (6):

$$K_n = K_\infty - (K_\infty - K_0)e^{\left(\frac{-n}{m}\right)} \quad (6)$$

In eq. (6), "n" is the layer number starting at the NP surface (i.e., n=0), "$K_n$" is the peak shift due to the n$^{th}$ layer, "$K_\infty$" is the bulk Knight shift (1.138 G/kHz), "$K_0$" is the surface layer Knight shift, and "m" is the number of layers defining the healing length which increases as the electronegativity of the atom bound to the surface increases.

Figure 11:
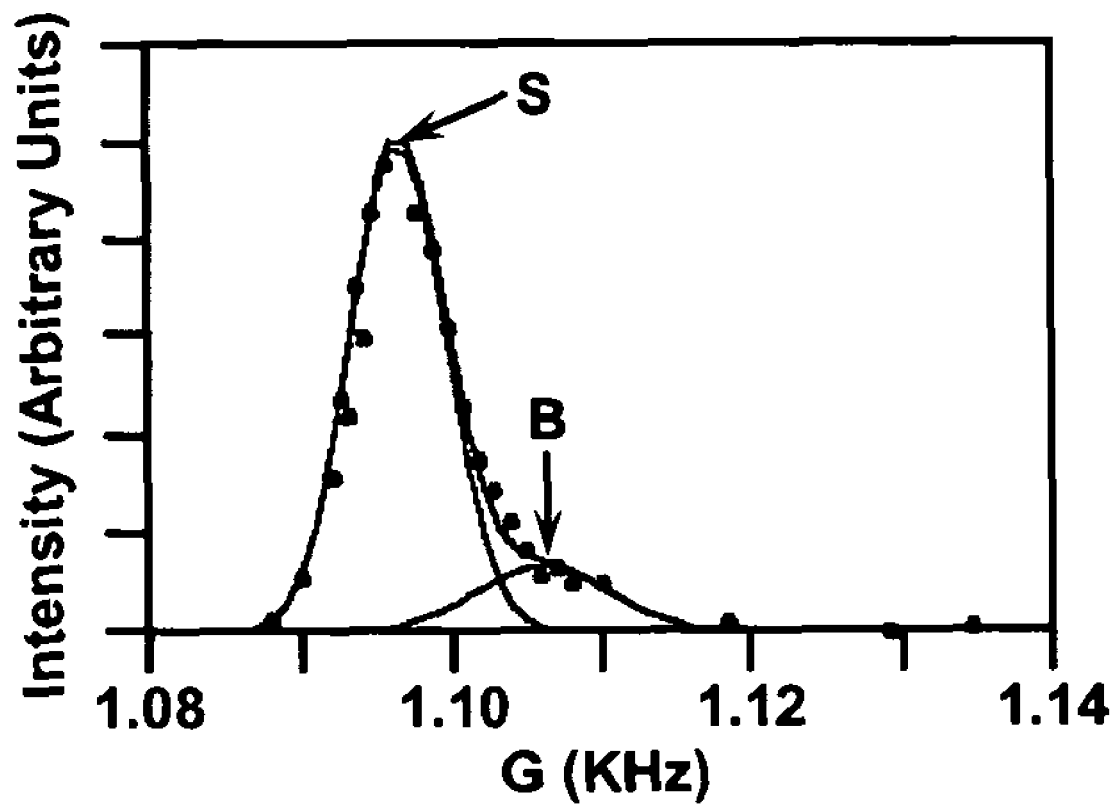
FIG. 11: Room temperature $^{195}Pt$ solid state NMR of TPPTP-Pt NPs. Data was acquired on a point by point basis with the two solid lines representing deconvoluted peak fitting. The relative ratio of the peaks due to the surface Pt atoms, S, to those of the underlying, or bulk, atoms, B, suggest that these particles are approximately 1.0 nm in diameter.

FIG. 11 depicts the room temperature solid state $^{195}$Pt NMR of the TPPTP-stabilized Pt NPs acquired on a point-by-point basis and the fit to the data (solid lines) according to the healing layer model of eq. (6), with $K_0$, m, and the Gaussian peak widths as the fitting parameters. The non-symmetrical $^{195}$Pt NMR line shape has been deconvoluted to separate peaks, each with different shifts; those due to the surface atoms, S, and those due to the underlying sub-surface bulk atoms, B. From integrated areas of these peaks and using the above equations, we estimate a Pt NP having 3-4 shells with an effective size of ~1.0 nm. This result is in agreement with the EXAFS experiments of Example 13 in that it indicates that only the inner core of atoms resemble bulk metal, while the majority of the platinum atoms are non-metallic in nature due to strong electronic coupling with surface-bound molecules. This behavior is similar to the effect of CO adsorption to the surfaces of transition metal clusters, which has been attributed to alterations in the Fermi level local density of states ($E_f$-LDOS) of the metal upon binding to the ligand.

The differences in TPPTP-Pt NP sizes observed between the $^{195}$Pt NMR results discussed in this example and the TEM image in Example 11 reflects the distortions of the NP by the coordinated TPPTP ligand. Both EXAFS and solid state $^{195}$Pt NMR analyses show a high percentage of surface to bulk Pt atoms reflecting this distortion. Consequently, the TEM, EXAFS, and $^{195}$Pt NMR data are most consistent with a NP shape comprising a flattened or truncated cubooctahedral geometry, with significant electronic interaction of the surface atoms with adsorbed molecular species.

Example 15

Surface $pK_a$ Determination for the TPPTP-Pt NPs

This example describes measurements of the $pK_a$'s of TPPTP-Pt NPs electrostatically adsorbed to indium tin oxide (ITO) or PAH-coated ITO substrate surfaces as model surfaces for multilayer fabrication.

Surface $pK_a$ measurements were made according to the method of Liu, et. al. for TPPTP-Pt NPs electrostatically bound to model ITO and PAH-coated ITO electrode surfaces (J. Liu, L. Cheng, B. Liu, S. Dong *Langmuir*, 16, 7471 (2000)). Briefly, an ITO electrode was treated with a 0.01 M HCl/0.01 M NaCl aqueous solution containing 2 mg/mL PAH for 30 min to provide a PAH-coated ITO electrode. Pt NPs were then bound to both the PAH-coated ITO electrode and a bare ITO electrode by immersion in a 0.01 M HCl/0.01 M NaCl aqueous TPPTP-Pt NP dispersion (0.3 mg/mL) for 2 h. Currents associated with the reversible oxidation of ferrocyanide (1 mM) in aqueous solutions having different pHs (adjusted using HCl or NaOH with NaCl at 0.02 M constant total ionic strength) were measured and the $pK_a$'s extracted from the resulting current vs. pH curves. Values of $pK_{a1}$~2.0±0.2 and $pK_{a2}$~8.4±0.3 were obtained for TPPTP-Pt NPs chemisorbed via the phosphonate groups to the ITO surface. Values for the PAH-coated ITO substrate of $pK_{a1}$~1.8±0.2 and $pK_{a2}$~9.0±0.3 differed only slightly from corresponding $pK_a$ values obtained on the bare ITO surface. For a typical TPPTP ligand bearing three phosphonate groups having a total of six P—O—H sites, these results indicate that even at pH 2 (e.g., and aqueous 0.01 M HCl/0.01 M NaCl solution), each TPPTP ligand should still possess an average charge of approximately −1.5 units, which is sufficient to maintain stability of the Pt NP dispersion during multilayer fabrication.

Example 16

Demonstration of Reproducible Fabrication of Uniform Multilayers Containing TPPTP-Pt NPs and PAH From pH 2 Solution on Fused Silica Substrates This example demonstrates the ability to fabricate uniform multilayers comprising alternating layers of TPPTP-Pt NPs and PAH on EDA-coated fused silica slides using a dipcoating method.

Figure 12:
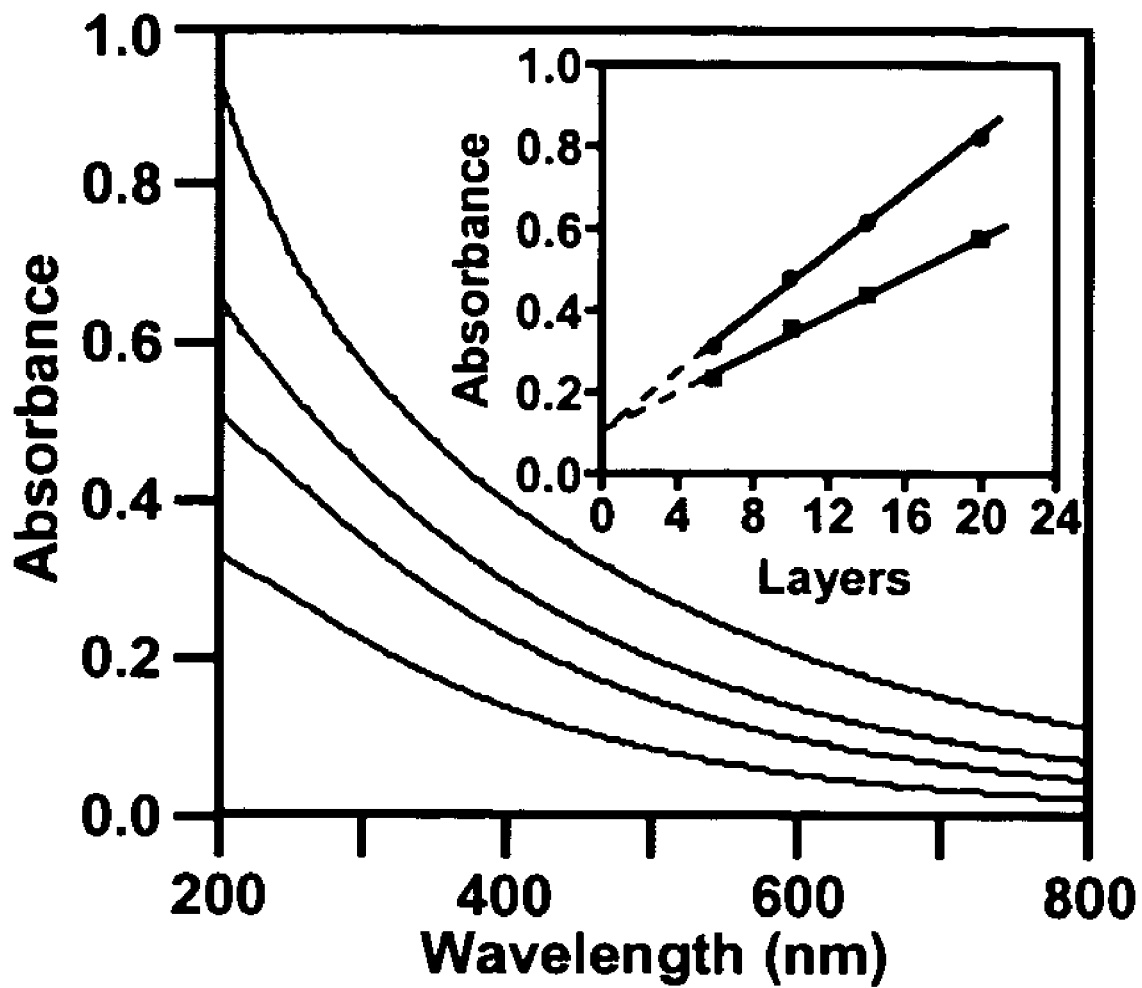
FIG. 12: Some UV-visible spectra of EDA/TPPTP-Pt NP/(PAH/TPPTP-Pt NP)$_{n-1}$ multilayer films deposited at pH 2 on fused silica. In order of increasing absorption intensity, spectra are shown for n=6, 10, 16, and 20. Inset: Linear plots of absorbance at 223 nm (circles) and 300 nm (squares) vs. number of TPPTP-Pt NP layers. Slope=0.0361; Intercept −0.105; $R^2$=0.9992 at 223 nm. Slope=0.0244; Intercept=0.098; $R^2$=0.9969 at 300 nm.

EDA siloxane films were chemisorbed to clean fused silica slides according to the literature procedure (M-S. Chen, S. L. Brandow, C. S. Dulcey, W. J. Dressick, G. N. Taylor, J. F. Bohland, J. H. Georger, Jr., E. K. Pavelchek, J. M. Calvert *J. Electrochem. Soc.*, 146, 1421 (1999)). Multilayer assemblies of TPPTP-Pt NPs were assembled via electrostatic LBL deposition with poly(allylamine hydrochloride) (PAH) on the fused silica slides coated with the cationic EDA monolayer film using the StratoSequence VI® robot dipcoater (nanoStrata Inc.) as described in the general Examples section above. Deposition times for the TPPTP-Pt NP dispersion (0.3 mg/mL in 0.01 M HCl/0.01 M NaCl aqueous solution) and PAH solution (0.3 mg/mL in 0.01 M HCl/0.01 M NaCl aqueous solution) were 2 h and 30 min, respectively. FIG. 12 shows the UV-visible absorption spectra for fused silica (FS) slides bearing multilayer films having the structure FS-EDA/TPPTP-Pt NP/(PAH/TPPTP-Pt NP)$_{n-1}$, with n=6, 10, 16, and 20 on each side of the slide. The absorbance of the TPPTP-Pt NP/PAH bilayers was monitored by UV-visible spectrometry at 223 nm and 300 nm during deposition, as shown in the inset of FIG. 12. The linearity in a plot of absorbance versus number of bilayers confirms uniform film growth and deposition of the PAH and TPPTP-Pt NP layers. The absence of plasmon resonance bands in the UV-visible spectrum indicates that there is no aggregation (J. Schmitt, G. Decher, W. J. Dressick, S. L. Brandow, R. E. Geer, R. Shashidhar, J. M. Calvert *Adv. Mater.*, 9, 61 (1997)) of the TPPTP-Pt NPs in the film and is consistent with the presence of sub-3 nm particles in accordance with solid state NMR (Example 14), TEM (Example 11), and EXAFS (Example 13) analyses.

Example 17

Demonstration of Reproducible Fabrication of Uniform Multilayers Containing TPPTP-Pt NPs and PAH From pH 2 Solution on Glassy Carbon Electrode Substrates This example demonstrates the ability to fabricate uniform multilayers comprising alternating layers of TPPTP-Pt NPs and PAH on an APh-functionalized glassy carbon electrode using a dipcoating method.

Figure 13:
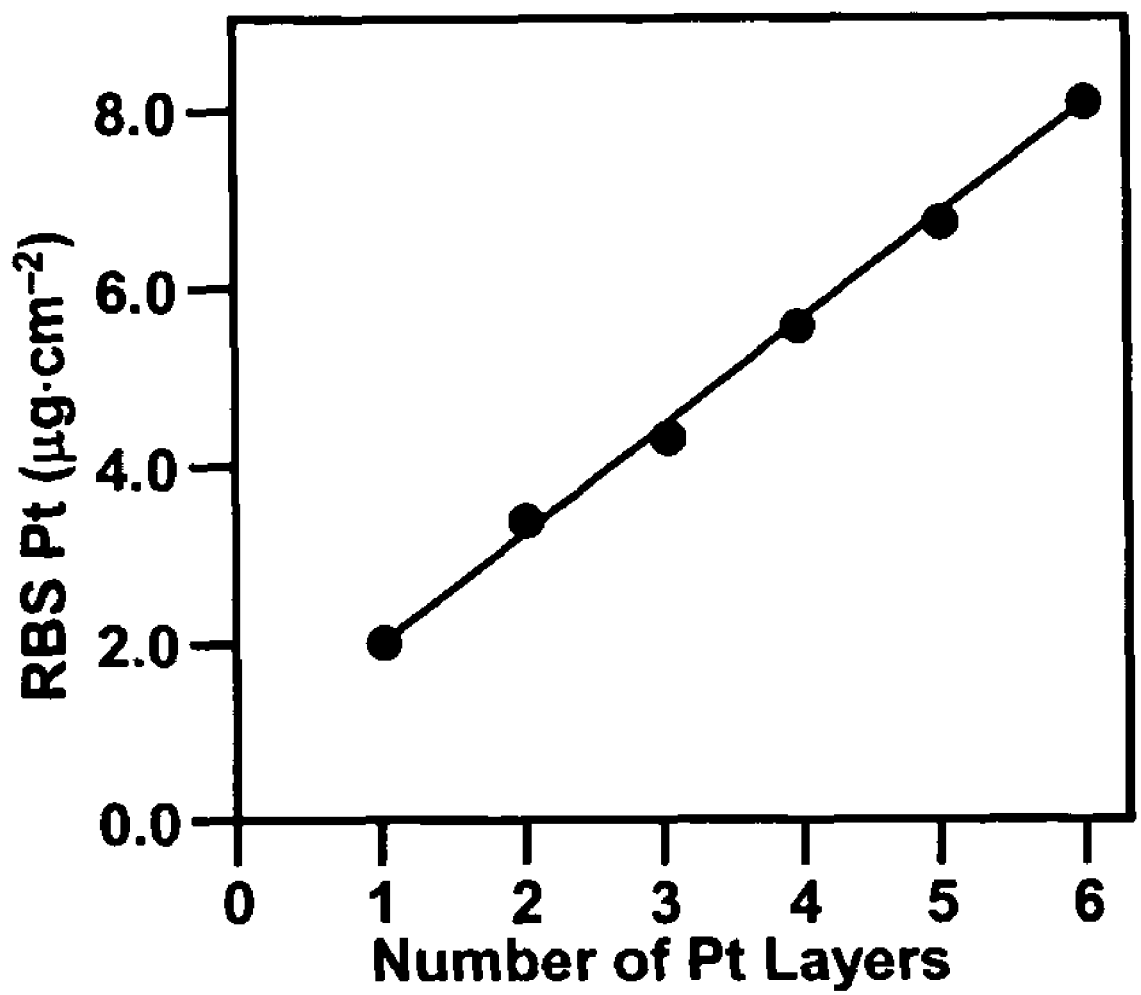
FIG. 13: Pt loading ($\mu g_{pt}/cm^2$) as measured by Rutherford Backscattering Spectroscopy versus number of (TPPTP-Pt NPs), (n=1-6) layers for separate APh-modified GCEs coated with TPPTP-Pt NP/PAH multilayers. Slope=1.217 μg·cm$^{-2}$; Intercept=0.6733 μg·cm$^{-2}$; $R^2$=0.9974.

GCEs modified with APh functional groups were prepared according to the method of Example 9. Multilayer assemblies of TPPTP-Pt NPs were prepared analogous to the method of Example 16 via electrostatic layer-by-layer deposition with PAH on the protonated APh modified GCES. To assemble TPPTP-PT NPs/PAH multilayers, a protonated GCE-APh electrode was dipped into an aqueous 0.01 M HCl/0.01 M NaCl dispersion containing the TPPTP-Pt NPs (0.3 mg/mL) for 24 h and rinsed with water, resulting in a one layer TPPTP-Pt NP electrode designated as GCE-APh/TPPTP-Pt NP. Additional TPPTP-Pt NP layers were added as required by sequential immersion in an aqueous 0.01 M HCl/0.01 M NaCl solution containing PAH (2 mg/mL) for 30 minutes, rinsing in water, immersion in aqueous 0.01 M HCl/0.01 M NaCl dispersion containing the TPPTP-Pt NPs (0.3 mg/mL) for 24 h, and rinsing again in water. The composition of the electrode so obtained is indicated by the shorthand notation, GCEAPh/TPPTP-Pt NP/(PAH/TPPTP-Pt NP)$_{n-1}$, where n is the total number of TPPTP-Pt NP layers present following n−1 PAH/TPPTP-Pt NP treatment cycles of the GCE-APh/TPPTP-Pt NP electrode. Separate electrodes were prepared having from one (i.e., n=1) to 6 (i.e., n=6) TPPTP-Pt NP layers in this manner and analyzed following use of each electrode in the electrochemistry experiments described in the Examples below to determine Pt loading via Rutherford Backscattering Spectroscopy (RBS). The plot of Pt loading versus number of TPPTP-Pt NPs layers (FIG. 13) shows that the platinum loading increases linearly with each layer deposited, in good agreement with the UV-visible spectroscopy results for uniform deposition of analogous multilayers fabricated on FS slides in Example 16. Note that neither the RBS plot in FIG. 13 nor the UV absorbance plots in FIG. 12 (inset) intersect at the origin, resulting in a positive offset for each line. This behavior indicates that larger amounts of TPPTP-Pt NPs are deposited on both the APh and EDA films covering the respective substrates than on PAH layers comprising the subsequent multilayer films under these deposition conditions.

Example 18

Demonstration of Reproducible Fabrication of Uniform Multilayers Containing TPPTC—Pt NPs and PAH From pH 2 Solution on Fused Silica Substrates This example demonstrates the ability to fabricate uniform multilayers comprising alternating layers of TPPTC—Pt NPs and PAH on EDA-coated fused silica slides using a dipcoating method.

TPPTC—Pt NPs were prepared as described in Example 5. The experiment described in Example 16 was then repeated using a dispersion of TPPTC—Pt NPs (0.3 mg/mL) in 0.01 M HCl/0.01 M NaCl aqueous solution and PAH (2 mg/mL) in 0.01 M HCl/0.01 M NaCl aqueous solution to fabricate a FS-EDA/TPPTC—Pt NP/(PAH/TPPTC—Pt NP)$_{19}$ multilayer on each side of an EDA-coated FS slide. Plots of film absorbance at 223 nm and 300 nm vs. the number of TPPTC—Pt NP layers deposited were both linear, consistent with deposition of a uniform film containing non-interacting Pt NPs. Specifically, at 223=n, we obtain a slope=0.0458, intercept=0.1066, and correlation coefficient ($R^2$)=0.9996 for the absorbance vs. number of TPPTC—Pt NP layers plot. Corresponding values at 300 nm are: Slope=0.0309; Intercept=0.1287; $R^2$=0.9940. From Example 16, for TPPTP-Pt NP/PAH multilayers prepared under identical conditions, we obtain Slope=0.0361; Intercept=0.105; $R^2$=0.9992 at 223 mm and Slope=0.0244; Intercept=0.098; $R^2$=0.9969 at 300 nm.

Example 19

Demonstration of Reproducible Fabrication of Uniform Multilayers Containing TPPTS-Pt NPs and PAH From pH 2 Solution on Fused Silica Substrates This example demonstrates the ability to fabricate uniform multilayers comprising alternating layers of TPPTS-Pt NPs and PAH on EDA-coated fused silica slides using a dipcoating method.

TPPTS-Pt NPs were prepared as described in Example 6. The experiment described in Example 16 was then repeated using a dispersion of TPPTS-Pt NPs (0.3 mg/mL) in 0.01 M HCl/0.01 M NaCl aqueous solution and PAH (2 mg/mL) in 0.01 M HCl/0.01 M NaCl aqueous solution to fabricate a FS-EDA/TPPTS-Pt NP/(PAH/TPPTS-Pt NP)$_{19}$ multilayer on each side of an EDA-coated FS slide. Plots of film absorbance at 223 nm and 300 nm vs. the number of TPPTS-Pt NP layers deposited were both linear, consistent with deposition of a uniform film containing non-interacting Pt NPs. Specifically, at 223 nm, we obtain a slope=0.0297, intercept=0.0291, and correlation coefficient ($R^2$)=0.9958 for the absorbance vs. number of TPPTS-Pt NP layers plot. Corresponding values at 300 nm are: Slope=0.0187; Intercept=0.0124; $R^2$=0.9969.

Example 20

Demonstration of the Ability to Tune Composition of Multilayers Containing TPPTP-Pt NPs and PAH by Varying the pH of the Deposition Solutions in Tandem This example demonstrates the ability to alter the composition (i.e., Pt NP loading) of multilayers comprising alternating layers of TPPTP-Pt NPs and PAH on EDA-coated fused silica slides by changing the pHs of the deposition solutions in tandem.

The experiment described in Example 16 was repeated at pH 6.5, rather than pH 2.0, at equivalent solution ionic strengths (i.e., μ~0.02 M in both cases) using a dispersion of TPPTP-Pt NPs (0.3 mg/mL) in 0.02 M NaCl (pH 6.5) aqueous solution and PAH (2 mg/mL) in 0.02 M MES (pH 6.5) aqueous buffer solution to fabricate a FS-EDA/TPPTP-Pt NP/(PAH/TPPTP-Pt NP)$_{19}$ multilayer on each side of an EDA-coated FS slide. No plasmon resonance bands were observed in the UV absorbance spectrum of the completed multilayer film, consistent with deposition of a uniform film exhibiting no Pt NP aggregation. The UV absorbances at 223 nm and 300 nm for the completed film were ~0.6106 and ~0.4235, respectively. Corresponding absorbance values of ~0.8250 at 223 nm and ~0.5794 at 300 nm were recorded for a film containing an identical number of TPPTP-Pt NP/PAH layers prepared at pH 2 (i.e., 0.01 M HCl/0.01 M NaCl) according to the method of Example 16. Because absorbance is proportional to the concentration of TPPTP-Pt NPs within the films, these differences indicate that for films containing components whose net charge depends on the local pH, such as TPPTP-Pt NPs (note Example 15) and PAH, changes in pH of the solutions or dispersions containing each component can influence the Pt NP loading of the resulting multilayer film.

Example 21

Demonstration of the Ability to Tune Composition of Multilayers Containing TPPTP-Pt NPs and PAH by Individually Varying the Ionic Strengths of the Deposition Solutions This example demonstrates the ability to alter the composition (i.e., Pt NP loading) of multilayers comprising alternating layers of TPPTP-Pt NPs and PAH on EDA-coated fused silica slides by individually changing the ionic strengths of the deposition solutions.

The experiment described in Example 20 was repeated with one variation. Specifically, the dispersion of TPPTP-Pt NPs (0.3 mg/mL) in 0.02 M NaCl (pH 6.5) aqueous solution was replaced by a dispersion of TPPTP-Pt NPs (0.3 mg/mL) in pure water (pH 6.5). Consequently, the NaCl concentration, and therefore the ionic strength of the dispersion used, was approximately zero. All other parameters remained the same as those used in Example 20 to fabricate a FSEDA/TPPTP-Pt NP/(PAH/TPPTP-Pt NP)$_{19}$ multilayer on each side of an EDA-coated FS slide. No plasmon resonance bands were observed in the UV absorbance spectrum of the completed multilayer film, consistent with deposition of a uniform film exhibiting no Pt NP aggregation. The UV absorbances at 223 nm and 300 nm for the completed film were ~0.2706 and ~0.1269, respectively. Corresponding absorbance values of 0.6106 at 223 nm and ~0.4235 at 300 nm were recorded for the film containing an identical number of TPPTP-Pt NP/PAH layers prepared at pH 6.5 using component solutions each having ~0.02 M ionic strength according to the method of Example 20. Because absorbance is proportional to the concentration of TPPTP-Pt NPs within the films, these absorbance differences indicate that Pt NP loading in these multilayer films can be controlled by individually adjusting the ionic strength or the component solutions or dispersions used to fabricate the multilayer film.

Example 22

Demonstration of the Catalytic Activity of the GCE-APh/(TPPTP-Pt NP/(PAH/TPPTP-Pt NP)$_{n-1}$ Multilayer Electrode Architectures for the HOR This example shows that multilayer electrode assemblies prepared using TPPTP-Pt NPs and PAH exhibit high catalytic activities for the HOR at low Pt loadings, similar to those noted previously for single crystal Pt(110) (N. M. Marković, B. N. Grgur, P. N. Ross *J. Phys. Chem. B*, 101, 5405 (1997)).

Figure 14:
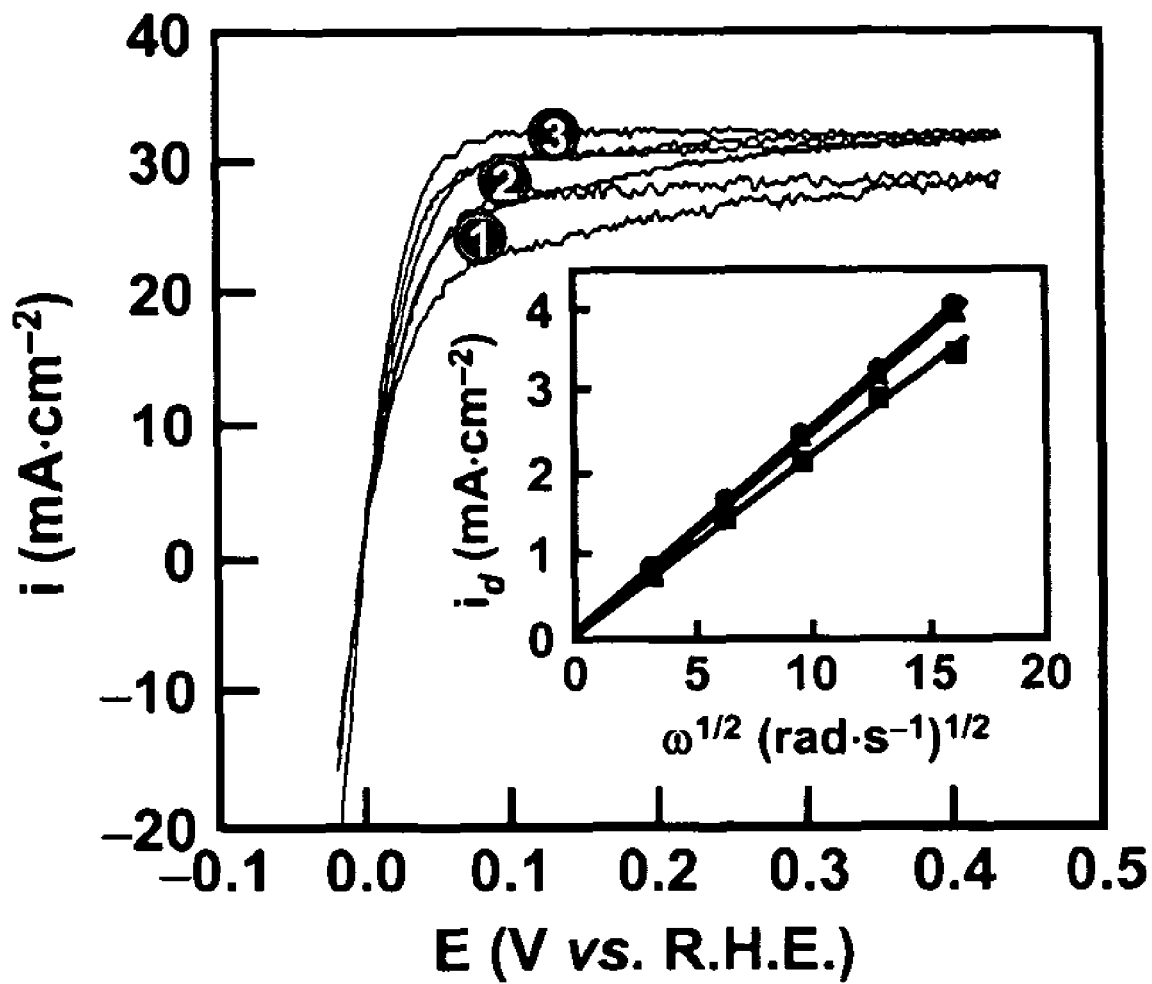
FIG. 14: RDE voltammetry for the HOR for electrodes bearing 1, 2, and 3 TPPTP-Pt NP layers in $H_2$-saturated 0.1 M $HClO_4$ at 60° C., 1600 rpm, and 20 mV·s$^{-1}$ sweep rate. Inset: Plot of $i_d$ versus $\omega^{1/2}$ for the HOR at 0.4 V.

Voltammetry of the HOR for GCE-APh/TPPTP-Pt NP/ (PAH/TPPTP-Pt NP)$_{n-1}$ multilayer electrode architectures comprising one (n=1; inset: squares), two (n=2; inset: triangles), and three (n=3; inset: circles) TPPTP-Pt NPs layers is shown in FIG. 14. The multilayer electrodes exhibit high activity, indicating that the catalytic sites for hydrogen adsorption are not blocked by the ligands and charge and mass transport through these films is not hindered. Further inspection of FIG. 14 shows that the anodic current rises sharply and reaches a plateau at relatively low overpotentials similar to Pt(110). At higher overpotentials, the current is determined by the diffusion of H$_2$ through the acidic media, and the theoretical value of the diffusion-limited current at the RDE, $i_d$, is given by the Levich equation (eq. (7)):

$$i_d = 0.62 n_e F D^{2/3} v^{-1/6} c_0 \omega^{1/2} \quad (7)$$

In eq. (7), $n_e$ is the number of electrons exchanged in the reaction, D is the diffusion coefficient of H$_2$ in 0.1 M HClO$_4$ at 60° C., p is the kinematic viscosity of the electrolyte, $\omega$ is the bulk concentration of H$_2$ in solution, and $\omega$ is the angular velocity of the RDE. A minimum of 2 layers TPPTP-Pt NPs, which corresponds to a platinum loading of 3.2 μg$_{Pt}$/cm$^2$, is usually required to reach the theoretical diffusion-limited current density of 3.1 mA/cm$^2$ at 1600 rpm as determined from the Levich equation. The limiting currents at 2 and 3 layer films of TPPTP-Pt NPs obey the Levich equation and increase linearly with the square root of rotation rate from 100-2500 rpm (inset, FIG. 14).

The standard current-overpotential relation for a reaction under mixed diffusion-kinetic control is described by eq. (8):

$$i/i_o = (1 - i/i_{l,a}) e^{-\alpha n_e F \eta / RT} - (1 - i/i_{l,c}) e^{(1-\alpha) n_e F \eta / RT} \quad (8)$$

In eq. (8), i is current, $i_o$ is the exchange current, $i_{l,a}$ and $i_{l,c}$ are the limiting anodic and cathodic currents, respectively, $n_e$ is the number of electrons involved in the slow electron-transfer step, α is the transfer coefficient for the reaction (typically ½), and η is the overpotential, alternately expressed as E-E$^{o'}$, where E is the potential and E$^{o'}$ is the formal potential for the reaction. At sufficiently large η, the cathodic term becomes negligible for the HOR, and equation 8 can be rearranged to yield the familiar Tafel form shown in eq.(9):

$$\eta = (2.303 \, RT/\alpha n_e F) \log i_o - (2.303 \, RT/\alpha n_e F) \log i_k \quad (9)$$

In eq. (9), $i_k$ is the kinetic current, which can be related to the Tafel current by eq. (10) for a reaction under mixed kinetic-diffusion control. If the rate-determining step is a slow electron transfer, plotting η versus the log term yields a straight line with a slope of 59/αn mV at 298 K, or 66/αn mV at 333 K.

$$i_k = i \cdot i_{l,a} / (i_{l,a} - i) \quad (10)$$

Figure 15:
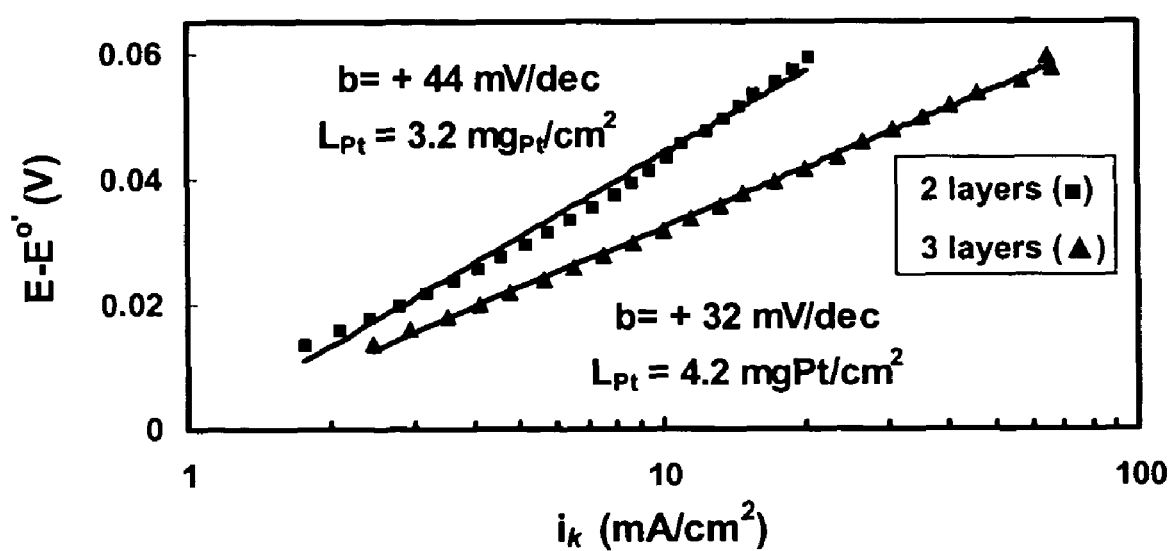
FIG. 15: Tafel plots for the HOR for electrodes bearing 2 and 3 layers of TPPTP-Pt NPs in $H_2$-saturated 0.1 M $HClO_4$ at 60° C.

Tafel slopes of +44 and +32 mV/dec were calculated for 2 and 3 layer TPPTP-Pt NP electrodes, respectively, as shown in FIG. 15. At low overpotentials, Marković and Ross report Tafel slopes for the HOR on various Pt crystal faces: +28 mV/dec for Pt(110), +37 mV/dec for Pt(100) and +74 mV/dec for Pt(111). They also concluded that the different crystal faces utilize different reaction mechanism for the HOR. While the TPPTP-Pt NPs display several crystal faces (note Example 12, FIG. 9), the Tafel slope for the 3 layer film of TPPTP-Pt NPs indicates a similar HOR mechanism as to Pt(110). We interpret the higher Tafel slope for the 2 layer film of TPPTP-Pt NPs, not to a change in reaction mechanism, but rather to a Pt-limited reaction condition.

Example 23

Demonstration of the Catalytic Activity of the GCE-APh/(TPPTP-Pt NP/(PAH/TPPTP-Pt NP)$_{n-1}$ Multilayer Electrode Architectures for the ORR This example shows that multilayer electrode assemblies prepared using TPPTP-Pt NPs and PAH exhibit high catalytic activities for the ORR, with maximum mass-specific current densities comparable to those obtained on Pt-Vulcan carbon electrodes (H. A. Gasteiger, S. S. Kocha, B. Sompalli, F. T. Wagner *Appl. Catal. B-Environ.*, 56, 9 (2005)) noted for the multilayer electrode comprising five TPPTP-Pt NP layers.

Figure 16:
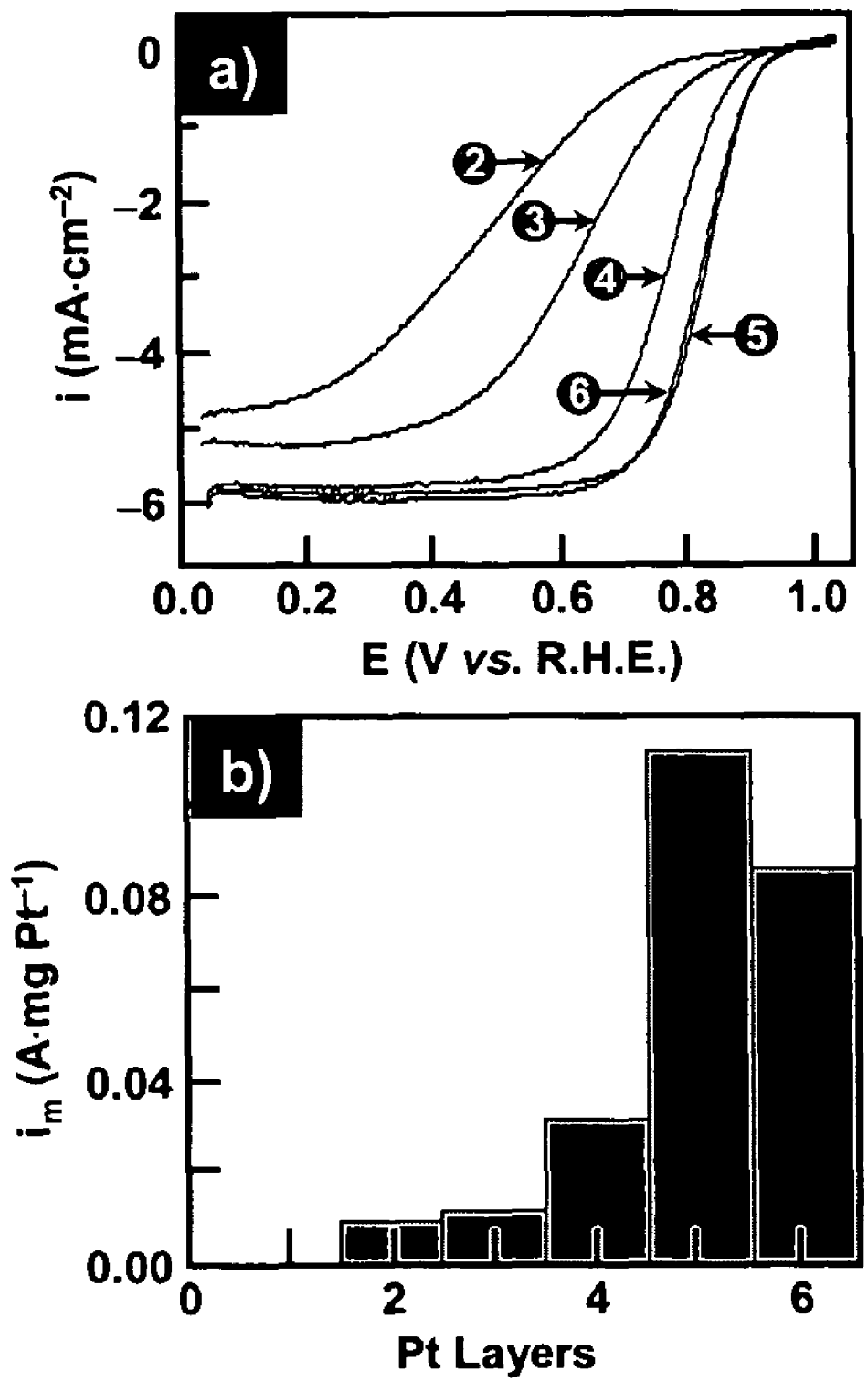
FIG. 16: a) RDE voltammetry for the ORR at multilayer electrodes having 2, 3, 4, 5, and 6 TPPTP-Pt NP layers in $O_2$-saturated 0.1 M $HClO_4$ at 60° C., 1600 rpm, and a 20 mV·s$^{-1}$ sweep rate; b) Mass-specific activities at 0.9 V versus layers of TPPTP-Pt NPs (2-6 layers).
Figure 17:
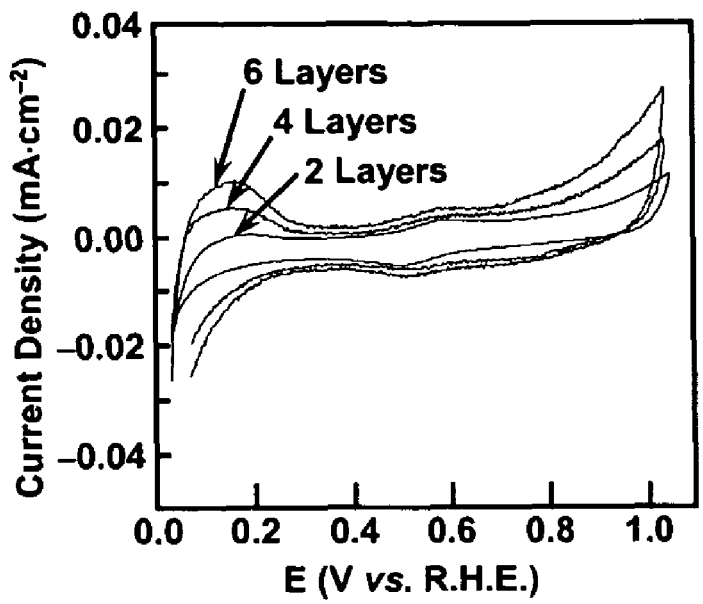
FIG. 17: RDE voltammetry at multilayer electrodes having 2, 4, and 6 TPPTP-Pt NP layers under Ar in 0.1 M $HClO_4$ at 60° C., 1600 rpm, and a 20 mV·s$^{-1}$ sweep rate.

FIG. 16a compares the anodic sweeps of the ORR voltammetry on GCE-APh/TPPTP-Pt NP/(PAH/TPPTP-Pt NP)$_{n-1}$ multilayer electrode architectures comprising two (n=2), three (n=3), four (n=4), five (n=5), and six (n=6) TPPTP-Pt NPs layers at 60° C. At larger overpotentials (potentials more negative than ~0.7 V for 4-6 layers of TPPTP-Pt NPs), the current is determined by the diffusion of O$_2$ through the acidic media, and the theoretical value of $i_d$ for an RDE is given by the Levich equation (eq. (7)). A minimum of 4 layers TPPTP-Pt NPs, which corresponds to a platinum loading of 5.6 μg$_{Pt}$/cm$^2$, is required to reach the theoretical diffusion-limited current density of −6.0 mA/cm$^2$ at 1600 rpm, as determined from the Levich equation, using the kinematic viscosity of the electrolyte (v=1.009×10$^{-2}$ cm$^2$/s), diffusion coefficient of oxygen (D=1.93×10$^{-5}$ cm$^2$/s), and the concentration of dissolved oxygen in solution (c$_0$=1.26×10$^{-6}$ mol/cm$^3$). Five layers of TPPTP-Pt NPs yields the highest mass-specific activity, $i_m$, at 0.9 V of 0.11 A/mg$_{Pt}$ (FIG. 16b) as calculated from the kinetic current, $i_k$ (eq. (6)), and normalized with the platinum loading of 6.6 μg$_{Pt}$/cm$^2$. This value compares favorably to values of 0.19 A/mg$_{pt}$ obtained using Pt-Vulcan carbon electrodes in HFCs (H. A. Gasteiger, S. S. Kocha, B. Sompalli, F. T. Wagner *Appl. Catal. B-Environ.*, 56, 9 (2005)). As the amount of TPPTP-Pt NPs layers is increased to 6 the mass-specific activity drops to 0.09 A/mg$_{Pt}$ at 0.9 V (FIG. 16b). Although more platinum is on the electrode surface in 6 layers of TPPTP-Pt NPs, a maximum current density is reached with 5 layers. The source of this behavior is presently unclear. However, no electronic resistivity is evident in electrode voltammetry performed in argon (note FIG. 17), indicating that significantly increased electronic resistance for the 6 layer TPPTP-Pt NP electrodes compared to the analogous 5 layer electrodes is not the cause of this behavior. Further investigations are underway to address this matter.

Example 24

Demonstration of the ORR Stoichiometry at the GCE-APh/(TPPTP-Pt NP/(PAH/TPPTP-Pt NP)$_{n-1}$ Multilayer Electrode Architectures This example shows that multilayer electrode assemblies prepared using TPPTP-Pt NPs and PAH can completely reduce oxygen to water by four electrons with high catalytic activities at low Pt loadings, similar to those noted previously for single crystal Pt(111) (J. X. Wang, N. M. Marković, R. R. Adzic *J. Phys. Chem. B*, 108, 4127 (2004)).

Figure 18:
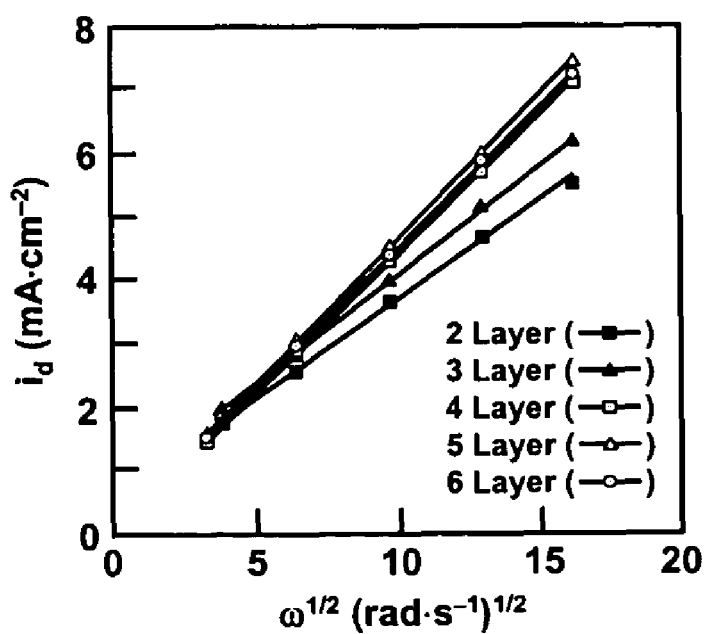
FIG. 18: Levich plot of the ORR at electrodes having 2, 3, 4, 5, and 6-layer films of TPPTP-Pt NPs in $O_2$-saturated 0.1 M $HClO_4$ at 60° C. at 0.35 V.

The slope of a linear plot derived from the Levich equation, as shown in FIG. 18, can be used to determine the number of electrons involved in the ORR. The experimental values of 0.44, 0.45, and 0.45 (mA/cm$^2$)rds$^{-1/2}$ for 4, 5, and 6 layers of TPPTP-Pt NPs agree well with the complete reduction of O$_2$ by four electrons. Two and three layers of TPPTP-Pt NPs had much lower slopes of 31 and 34 (mA/cm$^2$)rds$^{-1/2}$, respectively, indicating that not enough active platinum was accessible at the electrode surface to reduce all available O$_2$ to water.

Figure 19:
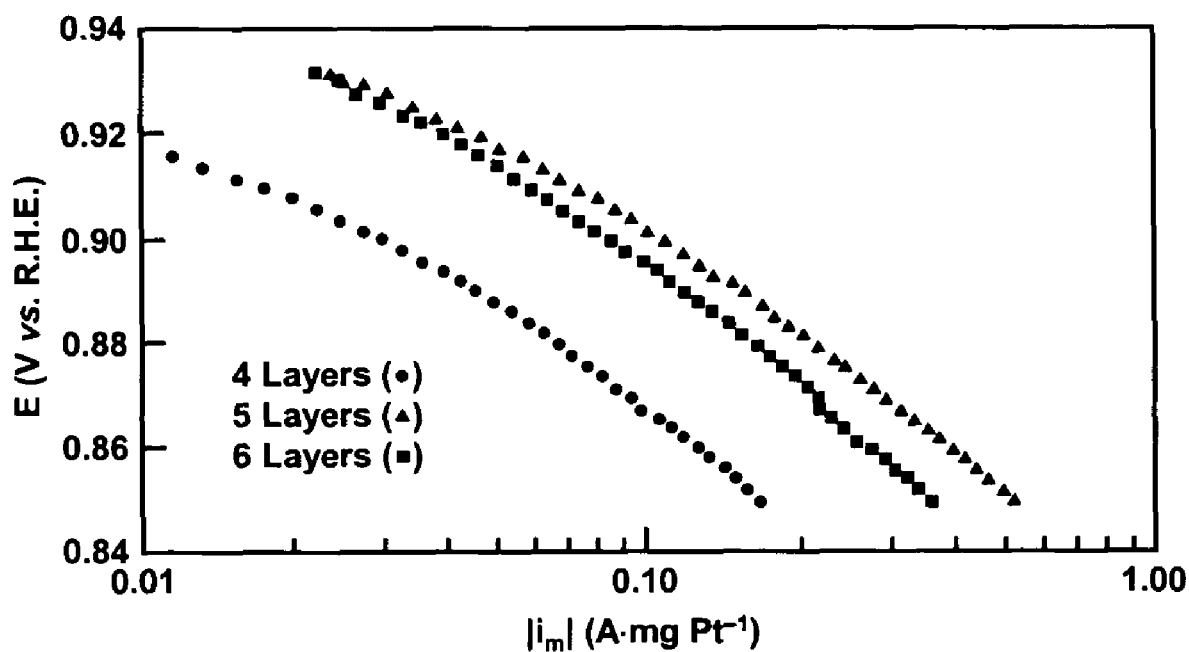
FIG. 19: Tafel plots for data in FIG. 16 (results are shown only for 4, 5 and 6 TPPTP-Pt NP layer electrodes).

FIG. 19 shows a logarithmic plot of the mass-transport corrected currents in the Tafel region for ORR at 4, 5, and 6 layer TPPTP-Pt NP electrodes. It is clear from the plot that there are 2 distinct slopes at higher (E>0.85 V) and lower potentials (E<0.83 V) indicating that the rate limiting step changes. The intrinsic Tafel slope for Pt with no adsorbates other than the ORR intermediates is −118 mV/decade (J. X. Wang, N. M. Marković, R. R. Adzic *J. Phys. Chem.*

TABLE 2

Kinetic Parameters for the ORR in 0.1 M HClO$_4$ at 60° C. on GCE-APh/TPPTP-Pt NP/(PAH/TPPTP-Pt NP)$_{n-1}$ electrodes

| Layers of TPPTP-Pt NPs | Tafel slope 0.92-0.85 V (mV/dec) | Tafel slope 0.83-0.73 V (mV/dec) | Mass-specific activity, $i_{m(0.9V)}$ (A/mg$_{Pt}$) | Pt loading (μg$_{Pt}$/cm$^2$) |
|---|---|---|---|---|
| 4 | −75 | −109 | 0.03 | 5.6 |
| 5 | −67 | −104 | 0.11 | 6.6 |
| 6 | −71 | −101 | 0.08 | 8.1 |
| Pt(111) | −59 | −118 | — | — |

B, 108, 4127 (2004)). Deviations in the Tafel slope at higher potentials in perchloric acid are attributed to OH$^-$ adsorption, which hinders oxygen reduction. The experimental values of −75, −67, and −71 mV/decade at higher potentials for 4, 5, and 6 layers TPPTP-Pt NPs, respectively, are consistent with results seen for ORR on Pt(111) (Table 2). Correlations of Tafel slopes and voltammetry between well-defined single-crystal electrodes, such as Pt (111), and Pt NPs suggest that ORR mechanisms are the same for each electrode.

Example 25

Demonstration of the Stability of the GCE-APh/(TPPTP-Pt NP/(PAH/TPPTP-Pt NP)$_{n-1}$ Multilayer Electrode Architectures This example shows that the GCE-APh/(TPPTP-Pt NP/ (PAH/TPPTP-Pt NP)$_{n-1}$ multilayer electrode architectures are sufficiently stable and maintain their catalytic activity during repeated use or after storage.

In order to confirm the stability of the multilayer electrodes during our HOR and ORR experiments, a 5 layer TPPTP-Pt NPs electrode was cycled between 1.0 and 0 V at 20 mV/s for 20 cycles in 0.1 M HClO$_4$ at 60° C. No appreciable loss in the catalytic current of oxygen reduction was observed, consistent with reproducible catalytic behavior. Additionally, no change in the mass-specific activity at 0.9 V was observed after exposure to air for several days. Furthermore, XPS spectra were collected on APh-grafted carbon paper modified with a monolayer of TPPTP-PT NPs before and after electrochemical measurements to confirm the TPPTP ligand remains intact. No measurable change was observed in the Pt 4f or P 2p region after electrochemical measurements, indicating that the ligands remain unchanged.

Example 26

Demonstration of the Ability of Various Metal Ions to Crosslink TPPTP-Pt NPs This example shows that various cationic metal ions in aqueous solution can effectively crosslink TPPTP-Pt NPs via interaction with the TPPTP ligand phosphonate groups.

Aqueous solutions containing Fe(II)(NH$_4$)$_2$SO$_4$, Ca(II) Cl$_2$, Eu(III)(NO$_3$)$_3$, Ni(II)SO$_4$, Cu(II)Cl$_2$, and Co(II)SO$_4$ were prepared by separately dissolving ~5 mg of each salt in 1 mL water in individual test tubes. A dispersion of TPPTP-Pt NPs (0.3 mg/mL) in 0.01 M HCl/0.01 M NaCl aqueous solution was prepared and 1 mL aliquots were pipetted into each of the test tubes containing the solutions of the aforementioned metal salts. The mixtures were then observed during the next ~24 h for bulk precipitation of the TPPTP Pt NPs from the mixture, which served as an indicator for the interaction of the metal ions with the phosphonate groups of the TPPTP ligand. For the mixtures containing Fe(II)(NH$_4$)$_2$SO$_4$, Ca(II)Cl$_2$, and Eu(III)(NO$_3$)$_3$, a brown bulk precipitate formed within 15-30 minutes, leaving a clear, nearly colorless supernatant consistent with strong interactions of these ions with the phosphonate groups of the TPPTP ligand leading to extensive crosslinking. For the Cu(II)Cl$_2$, formation of the bulk precipitate required ~30-60 minutes, consistent with weaker interactions of this metal ion with the phosphonate groups of the TPPTP ligand. Precipitate was formed for the mixture containing the Ni(II)SO$_4$ only after 60 minutes and the total amount (i.e., volume) of material precipitated was only approximately half that observed for the other metal ions discussed above. For the experiment using Co(II)SO$_4$, precipitate was formed only after allowing the mixture to stand in air overnight. As a control experiment, the UV absorbance spectrum of the freshly-prepared TPPTP-Pt NP dispersion in 0.01 M HCl/0.01 M NaCl aqueous solution (pH ~2.0) was compared with that of the same dispersion aged 10 days at room temperature. No noticeable differences in the spectra were observed, consistent with the stability of the dispersion under these conditions (i.e., neither the HCl nor NaCl present interact with the phosphonate groups sufficiently strongly to destabilize the dispersion to produce a bulk precipitate). These experiments indicate that the interactions of metal ions with the phosphonate groups, and therefore their efficacy as materials for crosslinking the TPPTP-Pt NPs for fabrication of multilayer electrode architectures, decreases in the approximate order: $Fe(II)(NH_4)_2SO_4 \sim Ca(II)Cl_2 \sim Eu(II)(NO_3)_3 > Cu(II)Cl_2 > Ni(II)SO_4 > Co(II)SO_4$.

Example 27

Demonstration of the Ability to Reproducibly Fabricate a Multilayer Film Comprising Anionic Nafion® Ionomer and Cationic Poly-2-vinylpyridine by LBL Electrostatic Deposition This example demonstrates the ability to fabricate multilayer films containing polyanionic Nafion® ionomer using the LBL dipcoating deposition method.

An alcohol stock solution, useful for preparation of the Nafion® solution described below and as a rinse solution during multilayer fabrication, was prepared by mixing 10 mL isopropanol, 20 mL ethanol, and 20 mL methanol in a 100 mL volumetric flask and diluting to the mark with water. A stock Nafion® treatment solution, hereafter referred to as "Nafion®-A" solution, was prepared by weighing 0.55 grams of a well-shaken 10% weight Nafion® dispersion in water into a 25 mL volumetric flask on the weigh pan of a balance. A 4.5 mL aliquot of 0.1 M HCl (aq) solution was then added to the flask by pipet and the flask was diluted to the mark with the alcohol stock solution. The resulting clear, colorless Nafion®-A solution contains ~40% mixed alcohols by volume, ~0.018 M HCl, and ~2 mg Nafion® per mL of solution. A poly-2-vinyl-pyridine (2-PVP) solution containing ~1 mg 2-PVP/mL solution was separately prepared by dissolving 101 mg of 2-PVP in 100 mL of 0.02 M HCl (aq) solution.

Figure 20:
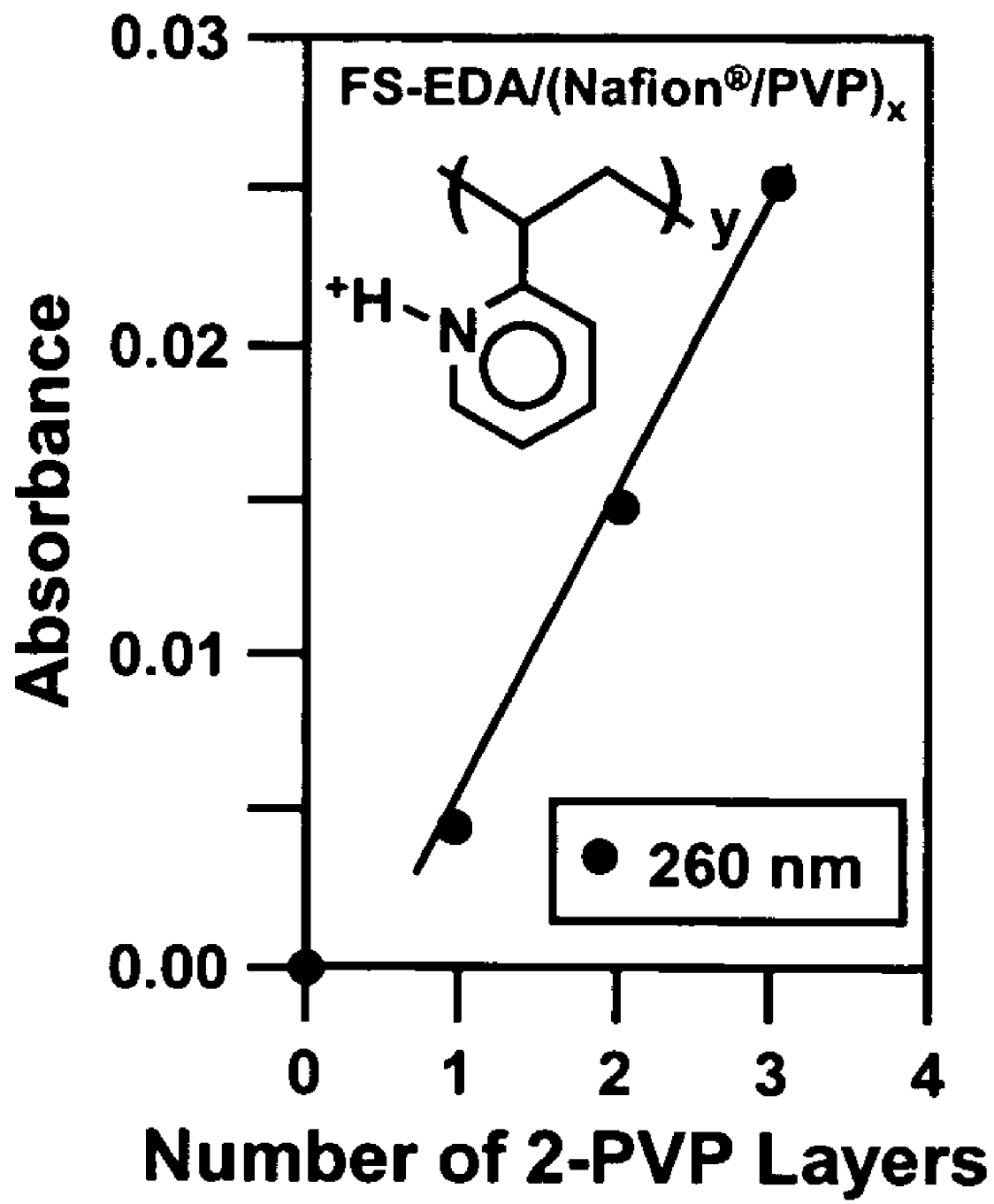
FIG. 20: Plot of 2-PVP absorbance at 260 nm for the FS-EDA/(Nafion®/2-PVP)$_x$(x=0-3) multilayers vs. number of 2-PVP layers.

Multilayer assemblies of Nafion® and 2-PVP were fabricated using the aforementioned solutions via electrostatic LBL deposition on EDA-coated fused silica slides analogous to the method described in Example 16. The Nafion® polyanion was deposited onto the cationic EDA-coated FS slide first for 30 minutes using an unstirred Nafion®-A solution. The treated slide was then rinsed twice with the alcohol stock solution (30 second rinses), followed by a single 30 second rinse with water. The surface of the slide was blown dry for 1 minute in a filtered stream of $N_2$ gas (liquid nitrogen boil-off) and immersed in the unstirred 2-PVP solution for 30 minutes. Thereafter, the slide was rinsed three times with water (30 second rinses) and blown dry with $N_2$ gas as described above. A UV absorbance spectrum of the treated slide was recorded before the treatment sequence was repeated. A total of three Nafion®/2-PVP bilayers were deposited to fabricate a film having the structure FS-EDA/(Nafion®/2-PVP)$_3$ on each side of the FS slide. The absorbance of the Nafion®/2-PVP bilayers was monitored by UV-visible spectrometry at the 260 nm absorbance peak associated with the pyridyl film chromophore. The linearity in a plot of absorbance at ~260 nm versus number of bilayers shown in FIG. 20 confirms uniform film growth and deposition of the Nafion® and 2-PVP layers, demonstrating the ability to utilize Nafion® as a component of multilayer films.

Example 28

Demonstration of the Porosity of Nafion® Layers Adsorbed onto an Oppositely-Charged Surface for Multilayer Fabrication This example shows that a layer of the polyanionic Nafion® ionomer adsorbed to the cationic EDA sites on an EDA-coated FS slide is sufficiently disorganized and/or permeable to allow penetration and interaction of a small anionic $Fe(II)[4,7-(m, p-sulfonatophenyl)_2-1, 10-phenanthroline]_3^{4-}$ complex with available EDA cationic N sites on the surface.

Figure 21:
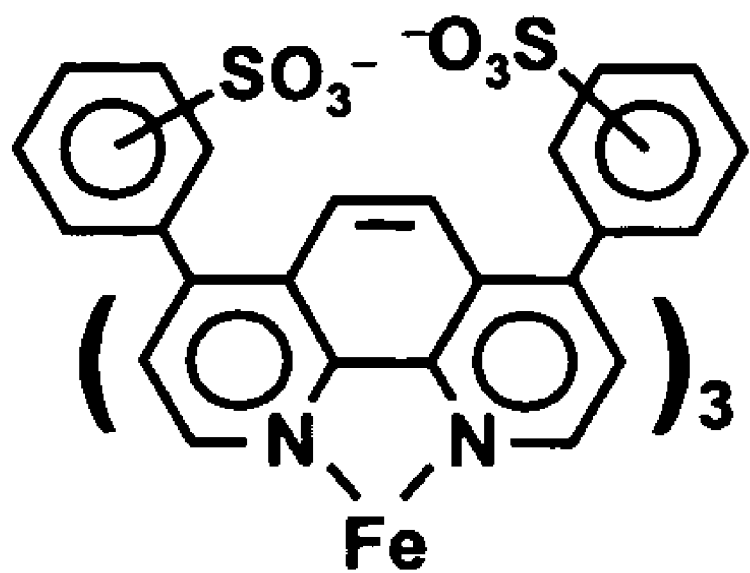
FIG. 21: Structure of the Fe(II)[4,7-(m, p-sulfonato-phenyl)$_2$-1,10-phenanthroline]$_3^{4-}$ Anion.

An ~0.02 M solution of tetrasodium tris-(bathophenanthrolinedisulfonate)iron(II) complex (i.e., $Na_4Fe(II)[4,7-(m, p-sulfonatophenyl)_2-1, 10-phenanthroline]_3$, note FIG. 21), hereafter designated as "FePhenS$^{4-}$", was prepared in situ by dissolving disodium bathophenanthrolinedisulfonate (1.61 g, ~3 mmol) and FeSO$_4$·7H$_2$O (0.278 g, 1 mmol) in an ~3:1 molar ratio, respectively, in 50 mL of 0.01 M HCl (aq) solution. A ~0.1 mg Nafion®/mL solution was prepared by the method of Example 27 using ~0.025 g, rather than 0.55 g, of 10% weight Nafion® dispersion per 50 mL of the final solution. EDA-coated fused silica slides were treated for times ranging from 15 s to 15 min using the ~0.1 mg Nafion®/mL solution and rinsed and dried as described in Example 27. The treated slides were then immersed in the FePhenS$^{4-}$ solution ($\epsilon_{282\ nm}$ ~$1.38 \times 10^5$ L·mole$^{-1}$ cm$^{-1}$; $\epsilon_{538\ nm}$~$2.05 \times 10^4$ L·mole$^{-1}$·cm$^{-1}$), together with an EDA-coated FS control slide that had not been treated with the ~0.1 mg Nafion®/mL solution, for 60 min. The slides were removed from the FePhenS$^{4-}$ solution, rinsed three times with water, and dried in a filtered stream of $N_2$ gas (liquid $N_2$ boil-off).

Figure 22:
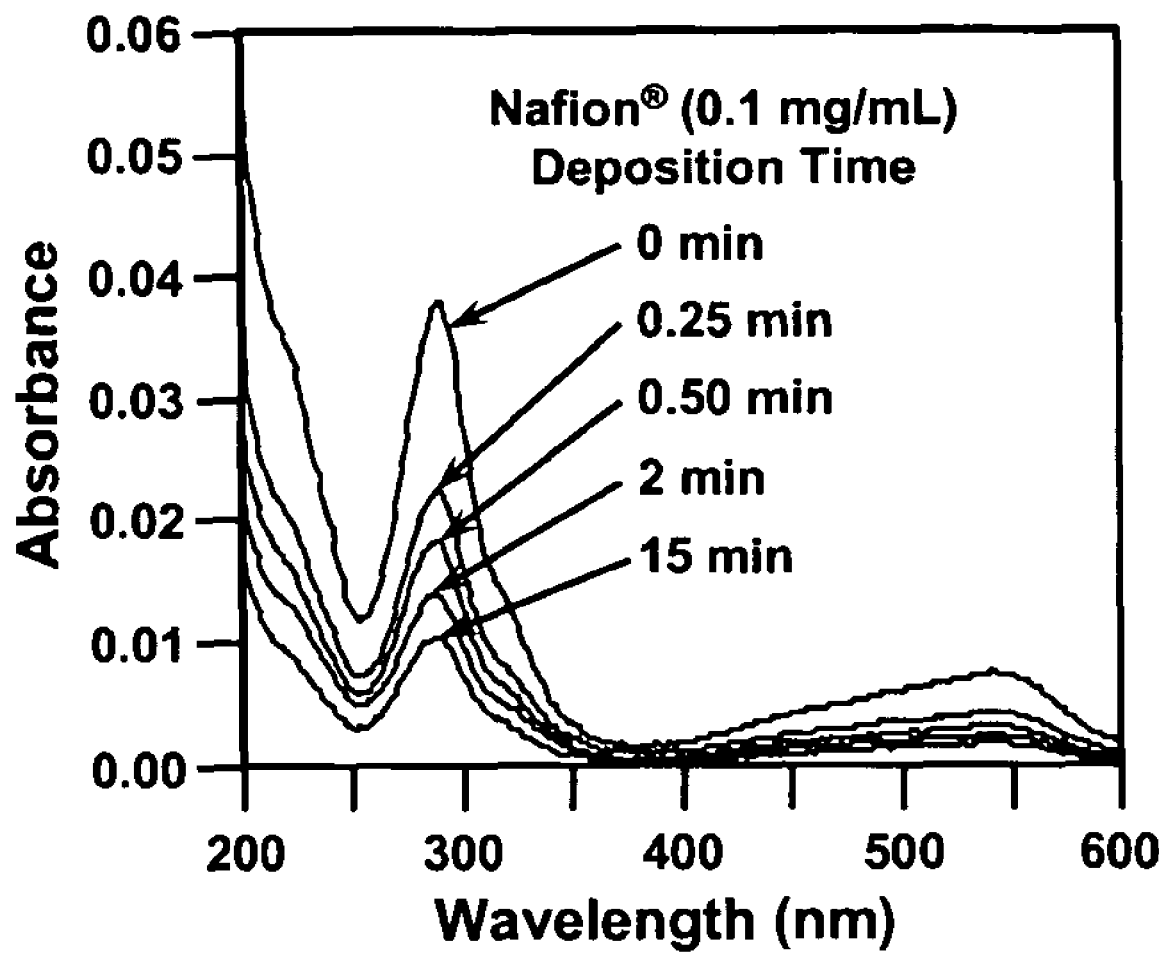
FIG. 22: UV-visible Absorption Spectra. EDA-coated FS slides treated for various times with Nafion® solution, followed by Na$_4$Fe(II)[4,7-(m, p-sulfonatophenyl)$_2$-1,10-phenanthroline]$_3$ solution, as described in Example 8. Spectra in order of decreasing intensity at ~290 nm (and 540 nm) correspond to Nafion® solution treatment times of 0 sec, 15 sec, 30 sec, 2 min, and 15 min.

UV-visible absorbance spectra were recorded for each slide, as shown in FIG. 22. For the control EDA-coated FS slide corresponding to no Nafion® deposition (i.e., black line spectrum; "0 min" treatment in FIG. 22), electrostatic binding of the anionic FePhenS$^{4-}$ to the cationic EDA sites readily occurs, as shown by the strong absorbance peaks at ~282 nm and 538 nm corresponding to the FePhenS$^{4-}$ in FIG. 22. For EDA-coated FS slides pre-treated with the Nafion® solution, significantly less FePhenS$^{4-}$ is bound. As Nafion® solution treatment times are increased, Nafion® coverage on the EDA surface increases and the quantity of FePhenS$^{4-}$ adsorbed decreases. The data in FIG. 22 clearly indicate that binding of the Nafion® film to the EDA-coated FS slide is essentially complete within 15 minutes. In addition, the observation of FePhenS$^{4-}$ on the surface even after completion of the Nafion® binding indicates that the deposited Nafion® is sufficiently disorganized, porous, and/or conformationally labile such that the small FePhenS$^{4-}$ species can penetrate the film and interact with the underlying EDA coating, despite electrostatic repulsions with the anionic Nafion® layer.

Example 29

Demonstration of the Use of pH to Control Deposition of Adjacent TPPTP-Pt NP and Nafion® Layers for Multilayer Fabrication on Si Substrates Modified by Chemisorbed Aminophenylsiloxane Monolayers This example shows the pH can be used to control the reactive amounts of like-charged TPPTP-Pt NPs and Nafion® ionomer on APh-modified Si wafers as adjacent layers for the fabrication of multilayer electrode assemblies.

A self-assembled monolayer of p-aminophenyltrimethoxysilane (APhS) was chemisorbed onto a SF slides and the native oxide layer of a Si wafer (as a surrogate for the APH-functionalized GCEs) by immersing a clean FS slide and Si wafer in a 1% volume solution of APhS in toluene:methanol 95:5 v/v containing 1 mM acetic acid at 55° C. for 1 hr. The treated substrates were rinsed twice with toluene, blown dry in a filtered $N_2$ gas stream (liquid $N_2$ boil-off), and baked at 120° C. for 4 minutes to complete the chemisorption process. The resulting APhS film on the FS slide exhibited a UV absorbance of 0.065 at 221 nm, consistent with chemisorption of a monolayer film (i.e., monolayer absorbance estimated using $\epsilon_{221\,nm}$=55,400 L·mole$^{-1}$·cm$^{-1}$ and $\epsilon_{251\,nm}$=28,900 L·mole$^{-1}$·cm$^{-1}$ in ACN). A Nafion® solution, hereafter designated "Nafion®-H" solution, was prepared as described in Example 27 for "Nafion®-A" solution with one variation: the 4.5 mL aliquot of 0.1 M HCl (aq) solution was replaced by a 2.5 mL aliquot of 0.1 M HCl (aq) solution and 2.0 mL aliquot of water to yield a final solution having 0.01 M HCl (aq). A second Nafion® solution, hereafter designated "Nafion®-OH" solution, was also prepared as described in Example 27 for "Nafion®-A" solution with one variation: the 4.5 mL aliquot of 0.1 M HCl (aq) solution was replaced by a 4.5 mL aliquot of water to yield a final solution having no added HCl (aq).

Two pieces of the Si wafer bearing the chemisorbed APhS siloxane monolayer were treated 2 hours with a TPPTP-Pt NP dispersion (0.3 mg/mL) in 0.01 M HCl/0.01 M NaCl aqueous solution, rinsed twice with water, and dried in a filtered N$_2$ gas stream (liquid N$_2$ boil-off). One of the Si wafer pieces was then treated 30 min using the Nafion®-H solution and the other was treated 30 min using the Nafion®-OH solution. Each treated wafer was rinsed with alcohol stock solution from Example 27 and dried in a filtered N$_2$ gas stream (liquid N$_2$ boil-off). The experiment was repeated with two additional pieces of Si wafer using a 24 hour, rather than 2 hour, treatment with the same TPPTP-Pt NP dispersion.

Each of the treated wafers was then analyzed by XPS to determine the relative amounts

TABLE 3

XPS Results of TPPTP-Pt NP/Nafion ®
Layer Depositions on APhS-coated Si Wafers

Figure 23:
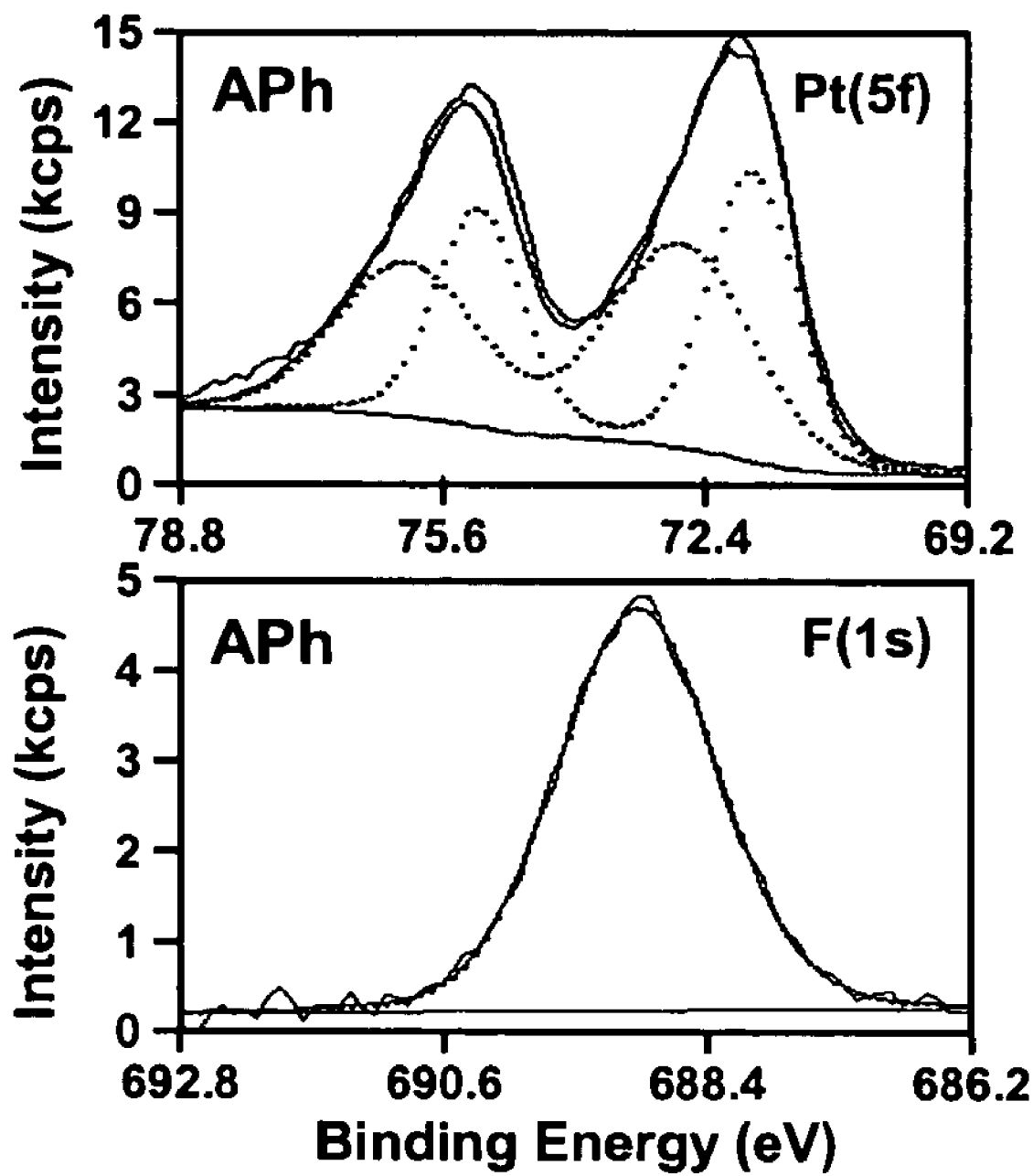
FIG. 23: XPS Spectra of Pt 4f (top) and F is (bottom) for Adjacent TPPTP-Pt NP and Nafion® Layers on APhS-coated Si wafers. Conditions: TPPTP-Pt NP (0.3 mg/mL in 0.01 M HCl/0.01 M NaCl (aq) solution, 24 hours); Nafion®-OH Solution (0.01 M HCl (aq) solution, 30 minutes).

| Nafion (HCl) | Pt Dip Time | Pt (%) | F(%) |
|---|---|---|---|
| 0.0 M | 2 hr | 98.6 | 1.4 |
| 0.01 M | 2 hr | 1.7 | 1.0 |
| 0.0 M | 24 hr | 4.6 | 1.0 |
| 0.01 M | 24 hr | 1.7 | 1.0 | of TPPTP-Pt NPs and Nafion® ionomer film deposited onto the surface, as measured by the relative areas (corrected for variations in instrument sensitivity as a function of element/energy) of the Pt 4f and F 1s peaks. Table 3 summarizes the treatment conditions and relative amounts of platinum and fluorine observed for each piece of Si wafer. Analysis of the results in Table 3 shows that use of the Nafion®-OH solution, which contains no added HCl, leads to minimal deposition of Nafion® onto a TPPTP-Pt NP layer, especially for the Si wafer treated only 2 hour by the TPPTP-Pt NPs. While the effect is much less pronounced for wafers treated 24 hours with the TPPTP-Pt NPs, the level of platinum present is still ~4.6 times that of fluorine. In contrast, use of the acidic Nafion®-H solution leads to deposition of Nafion® in amounts more nearly equivalent to the level of Pt present on the surface. Specifically, platinum levels are only ~1.7 times those of fluorine on the surface, regardless of TPPTP-Pt NP treatment times used. This is clearly illustrated in FIG. 23, which shows XPS results for the APhS-coated Si wafer treated 24 hours with the TPPTP-Pt NPs (i.e., 0.3 mg/mL dispersion in 0.01 M HCl/0.01 M NaCl), followed by Nafion®-H solution (i.e., containing added 0.01 M HCl (aq)). These results clearly indicate that the relative ratios of TPPTP-Pt NPs and the Nafion® ionomer deposited as adjacent layers on a surface can be controlled by judicious choice of the pH of the Nafion® solution.

Example 30

Demonstration of the Use of pH to Control Deposition of Adjacent TPPTP-Pt NP and Nafion® Layers for Multilayer Fabrication on Si Substrates Modified by Chemisorbed EDA Monolayers This example shows the pH can be used to control the reactive amounts of like-charged TPPTP-Pt NPs and Nafion® ionomer on EDA-modified Si wafers as adjacent layers for the fabrication of multilayer electrode assemblies.

The experiments described in Example 29 were repeated using EDA-coated Si wafers, rather than APhS-coated Si wafers, as substrates. The results are summarized in Table 4. Although

TABLE 4

XPS Results of TPPTP-Pt NP/Nafion ®
Layer Depositions on EDA-coated Si wafers

| Nafion (HCl) | Pt Dip Time | Pt (%) | F(%) |
|---|---|---|---|
| 0.0 M | 2 hr | 97.0 | 3.0 |
| 0.01 M | 2 hr | 0.23 | 1.0 |
| 0.0 M | 24 hr | 96.0 | 4.0 |
| 0.01 M | 24 hr | 1.1 | 1.0 | the results generally parallel those for the APhS-coated Si wafers in Example 29, there are some differences. Specifically, in contrast to the results shown in Table 3 for the APhS-coated Si wafers, differences in relative quantities of TPPTP-Pt NPs and Nafion® ionomer deposited onto the EDA-coated substrates are essentially independent of TPPTP-Pt NP treatment time for depositions using the Nafion®-OH solution. In addition, for the experiments using Nafion®-H solution, the treatment time of the substrate with the TPPTP-Pt NP dispersion more strongly affects the subsequent deposition of the Nafion® layer. These results indicate that the nature of the underlying film (i.e., in this case the monolayer chemisorbed to the Si substrate) also influences the relative amounts of TPPTP-Pt NPs and Nafion® that can subsequently be deposited in adjacent film layers.

Example 31

Demonstration of the Ability to Control the ORR Using Multilayer Electrodes Containing Adjacent TPPTP-Pt NP and Nafion® Layer This example shows the fabrication of multilayers containing PAH, TPPTP-Pt NPs, and Nafion® as component layers can affect the ORR.

A GCE was chemically modified with APh functional groups according to the method described in Example 9. The resulting electrode was then used as a substrate for the fabrication of a multilayer electrode assembly of structure GCE-APh/TPPTP-Pt NP/(Nafion®/PAH/TPPTP-Pt NP)$_3$ analogous to the method of Example 17. Specifically, TPPTP-Pt NP and PAH layers were deposited using the same TPPTP-Pt NP and PAH solutions, rinse procedures, and treatment times described in Example 17. For deposition of the Nafion® layers, the Nafion®-H solution, rinse procedures, and the 30 minute treatment time described in Example 29 were used.

Figure 24:
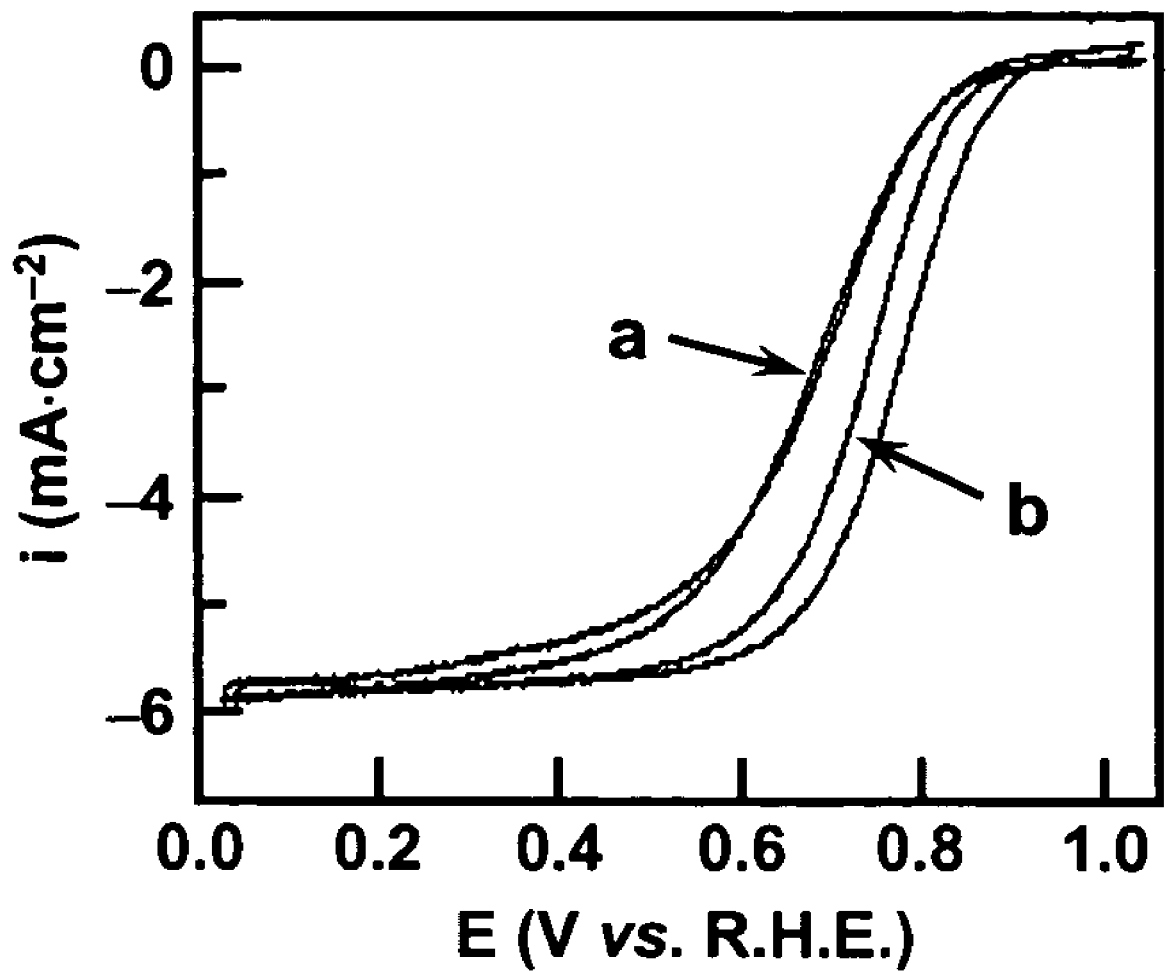
FIG. 24: Comparison of ORR Voltammograms for a GCE-APh/TPPTP-Pt NP/(Nafion®/PAH/TPPTP-Pt NP)$_3$ electrode (Curve "a") and a GCE-APh/TPPTP-Pt NP/(PAH/TPPTP-Pt NP)$_3$ electrode (Curve "b"). Parameters are identical to those described in FIG. 16 and Example 23.

The resulting electrode was used to catalyze the ORR as described in Examples 23 and 24. FIG. 24 shows the ORR voltammetry of the GCE-APh/TPPTP-Pt NP/(Nafion®/PAH/TPPTP-Pt NP)$_3$ electrode (Curve "a"), together with results for the corresponding GCE-APh/TPPTP-Pt NP/(PAH/TPPTP-Pt NP)$_3$ electrode from Examples 23 and 24 (Curve "b"). For the GCEAPh/TPPTP-Pt NP/(PAH/TPPTP-Pt NP)$_3$ electrode, the oxygen reduction current noted at 0.9 volts is −0.163 mA/cm$^2$, with a total Pt loading of 5.6 µg/cm$^2$ determined by RBS analysis. Addition of the Nafion® layers in the GCE-APh/TPPTP-Pt NP/(Nafion®/PAH/TPPTP-Pt NP)$_3$ electrode is accompanied by a slight increase in Pt loading to ~6.9 µg/cm$^2$. However, the overpotential for the ORR has now increased by ~50 mV (as shown by the shift of the voltammogram in Curve "a" to the left of that shown in Curve "b" in FIG. 24), with a corresponding decrease of the oxygen reduction current to +0.031 mA/cm$^2$. This behavior indicates that the ORR has been suppressed by the inclusion of the Nafion® layers, which are well-known blockers of electron-transfer reactions. Consequently, the use of Nafion® layers as components of our multilayer electrodes in the manner described in this example provides a convenient means to control the ORR, in this case suppressing the ORR relative to similar electrodes not containing Nafion® layers.

Example 32

Preparation of PAH Solutions Containing Perchlorate Counterions

This example describes the exchange of perchlorate ions for chloride ions in PAH solutions.

A known volume of 20 mg PAH/mL aqueous solution was prepared by dissolving PAH (average molecular weight range 8,500-11,000 g/mole, lot #TG123713MG) in water. Sufficient NaOH was added to bring the solution to pH~12. The basic solution was then transferred into a Spectra/Pore® Biotech Cellulose Ester (CE) dialysis membrane (molecular weight cut-off ~500 g/mole; flat width ~16 mm; diameter ~10 mm; volume/length ~0.81 mL/cm, Spectrum Labs, Inc.) and dialyzed against water for 1 hour. The dialysis tube containing the PAH sample was transferred to a container of fresh water and dialysis was continued for an additional two hours, after which the tube was transferred to fresh water again and dialysis continued for an additional 24 hours. Finally, the dialysis tube was again transferred to a container of fresh water and dialyzed for an additional 24 hours. The tube was then opened, the were contents transferred to a flask, and diluted ~1:10 v/v with an aqueous solution containing sufficient HClO$_4$ and NaClO$_4$ to obtain a final solution containing ~2 mg PAH/mL in 0.01 M HClO$_4$/0.01 M NaClO$_4$ aqueous solution.

What is claimed is:

1. A nanostructured electrode comprising:
  a. a conductive electrode substrate having a surface functional group
  wherein the surface functional group is covalently grafted on the conductive electrode substrate and
  wherein the surface functional group supports multilayer deposits and a layer of charge or chemical reactivity on the surface and
  wherein the surface functional group comprises positively-charged anilinium functional groups;
  b. a catalytic nanoparticle stabilized by a covalently-bound ligand bearing a peripheral functional group capable of interacting with said surface functional group wherein said catalytic nanoparticle is platinum or an alloy thereof; and
  c. a material capable of binding to said peripheral functional group
  wherein said material capable of binding to said peripheral functional group is a successive layer of said catalytic nanoparticles within a multilayered system bridged by said material.

2. The electrode of claim 1 wherein said conductive electrode substrate is chemically modified and wherein said peripheral functional group is a charged substituent on the periphery of said covalently bound ligand and is one selected from the group consisting of phenoxide, sulfonate, carboxylate, and phosphonate.

3. The electrode of claim 2 wherein said surface functional group creates a layer of charge or chemical reactivity and wherein said covalently bound ligand is one selected from the group consisting of a derivative of 2, 2'-bipyridine, 1, 10-phenanthroline, and a triphenylphosphine.

4. The electrode of claim 3 wherein said conductive electrode substrate is a conductive glassy carbon substrate and wherein the polyelectrolyte bridging material is a protonated polycation selected from the group consisting of linear polyethylenimine (L-PEI), branched polyethyleneimine (B-PEI), the hydrochloride acid salt of polyallylamine (PAH), and the perchloric acid salt of PAH.

5. The electrode of claim 4 wherein said conductive electrode substrate is electrochemically modified to create a surface functional group via covalent grafting capable of supporting multilayer growth via creation of a layer of charge or chemical reactivity on the surface.

6. The electrode of claim 3 wherein said layer of charge is a layer of positive charge.

7. The electrode of claim 6 wherein said covalently-bound ligand is a negatively-charged ligand.

8. The electrode of claim 1 wherein said catalytic nanoparticle contains platinum on at least a portion of the surface and wherein the electrode comprises five bilayers each containing a layer of Pt nanoparticles bearing on their surfaces one or more covalently bound 4,4',4"-tris-phosphonatophenylphosphine or 3, 3', 3"-tris-phosphonatophenylphosphine ligands and a layer of the perchloric acid salt of PAH.

9. The electrode of claim 1 wherein said covalently-bound ligand bearing a peripheral functional group has a charge opposite to or chemical reactivity amenable with that of said surface functional group.

10. The electrode of claim 1 wherein said material capable of binding to said peripheral functional group is a polyelectrolyte.

11. A nanostructured electrode comprising:
  a conductive glassy carbon electrode substrate containing covalently grafted surface functional groups which support binding of multilayers and having an initial layer of positive charge on the surface;
  a platinum nanoparticle stabilized by covalently bonded negatively-charged ligands wherein said platinum nanoparticle is covalently bound to tris-[4-phosphonatophenyl]phosphine ligand; and
  a polyelectrolyte.

12. The electrode of claim 11 wherein said polyelectrolyte is polyallylamine hydrochloride.

13. The electrode of claim 11 wherein said surface functional group is a cationic aminophenyl group.

14. The electrode of claim 11 wherein said platinum nanoparticle is covalently bound to tris-[4-carboxylatophenyl] phosphine ligand.

15. The electrode of claim 11 wherein said surface functional group is N-(2-aminoethyl)-3-aminopropyltrimethoxysiloxane self-assembled monolayer.

16. A nanostructured electrode comprising:
a conductive glassy carbon electrode substrate;
a surface functional group covalently grafted to the conductive glassy carbon electrode substrate wherein the surface functional group covalently grafted provides a layer of negative charge;
a nanoparticle stabilized by covalently bonded ligands bearing a positively-charged peripheral functional group; and
a material capable of binding to said peripheral functional group.

17. The electrode of claim 16 wherein said nanoparticle contains platinum and wherein said surface functional group is 4-sulfonatophenyl group and wherein said ligand is a triphenylphosphine derivative having a positively-charged peripheral functional group of the hydrochloride salt of an aminomethyl group and wherein said material is a negatively-charged polyelectrolyte.

18. The nanostructured electrode of claim 16 wherein said covalently bound ligand bearing one or more peripheral substituents does not contain sulfur in an oxidation state <+4 and is a weak to moderate pi-acid or pi-acceptor ligand.

19. The electrode of claim 3 wherein said 2,2'-bipyridine, 1,10-phenanthroline, and triphenylphosphine ligands in which chemical functional groups, at least one of which is charged, covalently attached to the peripheries of said ligands, comprising said derivatives, are attached to the 4,4',5, and/or 5' positions of 2,2'-bipyridine, the 3,4,5,6,7, and/or 8 positions of 1,10-phenanthroline, and the 3,3',3",4,4', and/or 4" positions of triphenylphosphine.

20. The electrode of claim 19 in which said covalently bound ligand bearing a charged substituent on its periphery is 4,4',4"-tris-sulfonatophenylphosphine, 3,3',3"-tris-sulfonatophenylphosphine, 4,4',4"-tris-carboxyphenylphosphine, 3,3',3"-tris-carboxyphenylphosphine, or 4,4',4"-tris-phosphonatophenylphosphine or 3,3',3"-tris-phosphonatophenylphosphine.

21. A nanostructured electrode comprising:
a plurality of catalytic nanoparticles;
wherein said plurality of catalytic nanoparticles comprise electron conducting metal-containing nanoparticles with surfaces containing covalently bound ligands,
wherein said ligands bear one or more substituents on the peripheries of said ligands,
wherein at least one of said substituents is charged,
wherein the covalently bound ligands and the one or more substituents tune the catalytic properties of the catalytic nanoparticles; and
a bridging material comprising one selected from the group consisting of a polyelectrolyte, a metal ion, and a second nanoparticle having a net charge opposite of the plurality of catalytic nanoparticles;
wherein the bridging material conducts or transports protons or holes and is deposited on an electrically conductive substrate surface in alternating layers between said catalytic nanoparticles providing a composite film containing both electron conductive and proton conductive component layers arranged in a manner to maximize their interfacial contact area
while maintaining electrical communication with said electrically conductive substrate and a fuel cell electrolyte solution.

22. The nanostructured electrode of claim 21 wherein said covalently bound ligand bearing one or more peripheral substituents does not contain sulfur in an oxidation state <+4 and is a weak to moderate pi-acid or pi-acceptor ligand.

23. The nanostructured electrode of claim 22 wherein the covalently bound ligands in which said substituents, at least one of which is charged, are covalently attached to the periphery of said ligand.

24. The nanostructured electrode of claim 21 wherein said polyelectrolyte bridging material is a protonated polycation selected from the group consisting of linear polyethylenimine (L-PEI), branched polyethyleneimine (B-PEI), the hydrochloride acid salt of polyallylamine (PAH), and the perchloric acid salt of PAH.

25. The nanostructured electrode of claim 21 wherein said bridging material is a polyoxometalate, surface oxidized carbon colloid, or a semiconducting nanoparticle comprising ruthenium dioxide, indium tin oxide, or titanium oxide.

26. The nanostructured electrode of claim 21 wherein said bridging material is a metal ion.

27. The electrode of claim 16 wherein said electrically conductive substrate is a glassy carbon electrode (GCE) whose surface is chemically modified by a monolayer of covalently attached anilinium functional groups and further including a bilayer comprising one layer of Pt nanoparticles bearing on their surfaces one or more covalently bound 4,4',4"-tris-phosphonatophenylphosphine or 3,3',3"-tris-phosphonatophenylphosphine ligands and one layer of the perchloric acid salt of PAH.

28. The electrode of claim 27 further comprising five bilayers, each containing a layer of Pt nanoparticles bearing on their surfaces one or more covalently bound 4,4',4"-tris-phosphonatophenylphosphine or 3,3',3"-tris-phosphonatophenylphosphine ligands and a layer of the perchloric acid salt of PAH.

* * * * *